(12) United States Patent
Kassab Arabo

(10) Patent No.: US 9,233,703 B2
(45) Date of Patent: Jan. 12, 2016

(54) COLLAPSIBLE LAUNDRY AND ACCESSORY BASKET WITH WHEELED AND CARRYABLE CONFIGURATIONS

(71) Applicant: Alivia Kassab Arabo, West Bloomfield, MI (US)

(72) Inventor: Alivia Kassab Arabo, West Bloomfield, MI (US)

( * ) Notice: Subject to any disclaimer, the term of this patent is extended or adjusted under 35 U.S.C. 154(b) by 0 days.

(21) Appl. No.: 14/518,839

(22) Filed: Oct. 20, 2014

(65) Prior Publication Data
US 2015/0108739 A1    Apr. 23, 2015

Related U.S. Application Data

(60) Provisional application No. 61/892,915, filed on Oct. 18, 2013.

(51) Int. Cl.
| | |
|---|---|
| *B62B 3/00* | (2006.01) |
| *B62B 3/02* | (2006.01) |
| *A45C 5/14* | (2006.01) |
| *A45C 13/26* | (2006.01) |
| *A45C 13/04* | (2006.01) |

(52) U.S. Cl.
CPC . *B62B 3/025* (2013.01); *A45C 5/14* (2013.01); *A45C 13/04* (2013.01); *A45C 13/262* (2013.01); *B62B 3/00* (2013.01)

(58) Field of Classification Search
CPC .......... B62B 3/00; B65D 31/10; B65D 33/12; A45C 13/04; A45C 13/262; A45C 5/14
See application file for complete search history.

(56) References Cited

U.S. PATENT DOCUMENTS

| | | | | |
|---|---|---|---|---|
| 1,148,761 | A |   | 8/1915 | Day |
| 1,691,904 | A | * | 11/1928 | Gamble ............................ 206/8 |
| 2,228,248 | A |   | 1/1941 | Ahlmark |
| 2,785,724 | A |   | 3/1957 | Gold |
| 4,343,487 | A |   | 8/1982 | Crothers |
| 4,795,186 | A | * | 1/1989 | Tyus .......................... B62B 3/02 |
| | | | | 280/37 |
| 5,197,754 | A | * | 3/1993 | Ward ............................ 280/655 |
| 5,244,219 | A | * | 9/1993 | Hadlum ..................... B62B 1/12 |
| | | | | 280/47.26 |
| 5,464,113 | A | * | 11/1995 | Ho ........................... B65D 9/10 |
| | | | | 220/651 |
| 5,511,807 | A |   | 4/1996 | Snyder |
| 5,630,602 | A | * | 5/1997 | Vanderslice ............. A45C 5/14 |
| | | | | 280/47.17 |
| 5,671,858 | A |   | 9/1997 | Hsu |
| 5,918,553 | A | * | 7/1999 | Hellwig .................... A47B 9/14 |
| | | | | 108/147.19 |
| 6,089,394 | A |   | 7/2000 | Ziglar |
| 6,220,998 | B1 | * | 4/2001 | Kellogg et al. ............... 493/218 |
| 6,315,143 | B1 |   | 11/2001 | Dotts |
| 6,588,620 | B1 |   | 7/2003 | Thuma et al. |

(Continued)

*Primary Examiner* — S. Joseph Morano
*Assistant Examiner* — Hilary L Johns
(74) *Attorney, Agent, or Firm* — Dinsmore & Shohl LLP; Douglas J. McEvoy

(57) ABSTRACT

A wheeled enclosure having an interior volume defining body including a rigid base and a plurality of upwardly extending and flexible sides. A plurality of wheeled supports are incorporated into the rigid base, a perimeter establishing inner frame extending upwardly from the rigid base and provides structural support to the flexible sides such that the frame is converted between upward expanded and inward collapsed positions. A telescoping handle extends from a rear of the body and may be pivotally secured to an edge of the rigid base. The handles may extend from upper locations of a pair of opposite sides of the body in order to establish a reclosable top to the volume defining body. An accessory supporting pocket may be secured to an exterior of at least one of the flexible sides. Shoulder supporting straps are secured to upper edges of the sides to facilitate carrying the body in a handle retracted and enclosure expanded position.

12 Claims, 21 Drawing Sheets

(56) References Cited

U.S. PATENT DOCUMENTS

| | | | |
|---|---|---|---|
| 7,726,671 B2* | 6/2010 | Musi | 280/47.26 |
| 8,070,006 B2 | 12/2011 | Austin et al. | |
| 8,100,280 B1 | 1/2012 | Hernandez | |
| 8,387,814 B2 | 3/2013 | Zheng | |
| 8,662,268 B2* | 3/2014 | Keir | A45C 5/14 190/115 |
| 2008/0053995 A1 | 3/2008 | Wang | |
| 2009/0019654 A1* | 1/2009 | Lingren | A47L 13/58 15/115 |
| 2010/0059514 A1 | 3/2010 | Zheng | |
| 2011/0215094 A1 | 9/2011 | Richard | |
| 2012/0085759 A1 | 4/2012 | Sabounjian | |
| 2012/0168436 A1 | 7/2012 | Wang | |

* cited by examiner

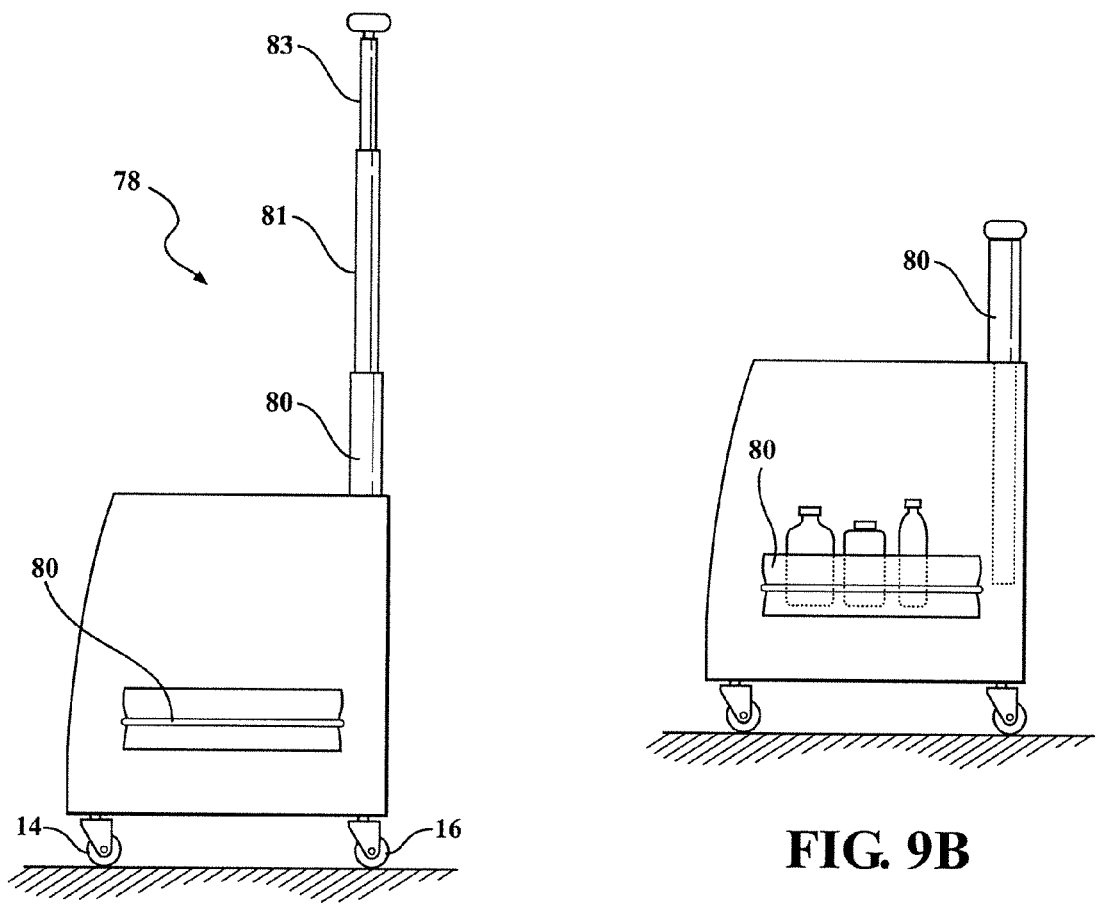
FIG. 9A
FIG. 9B
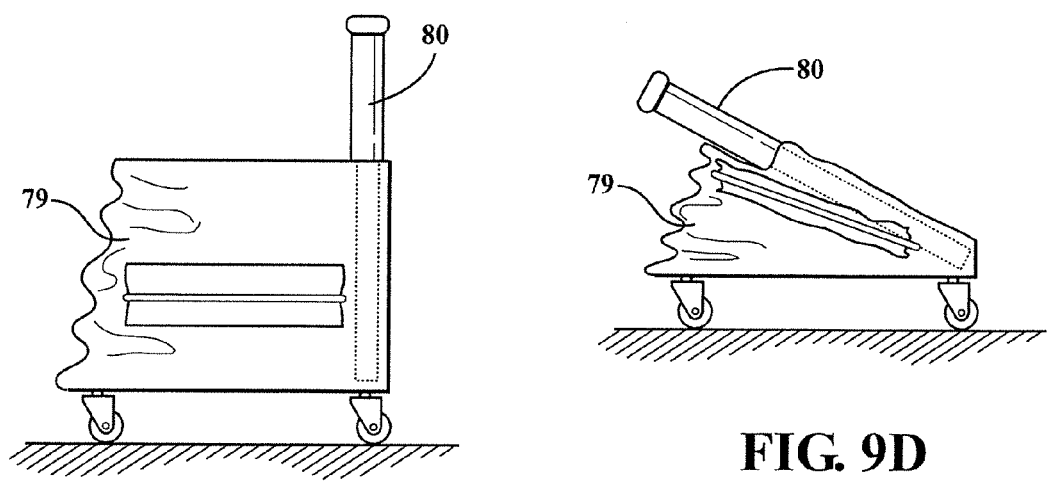
FIG. 9C
FIG. 9D

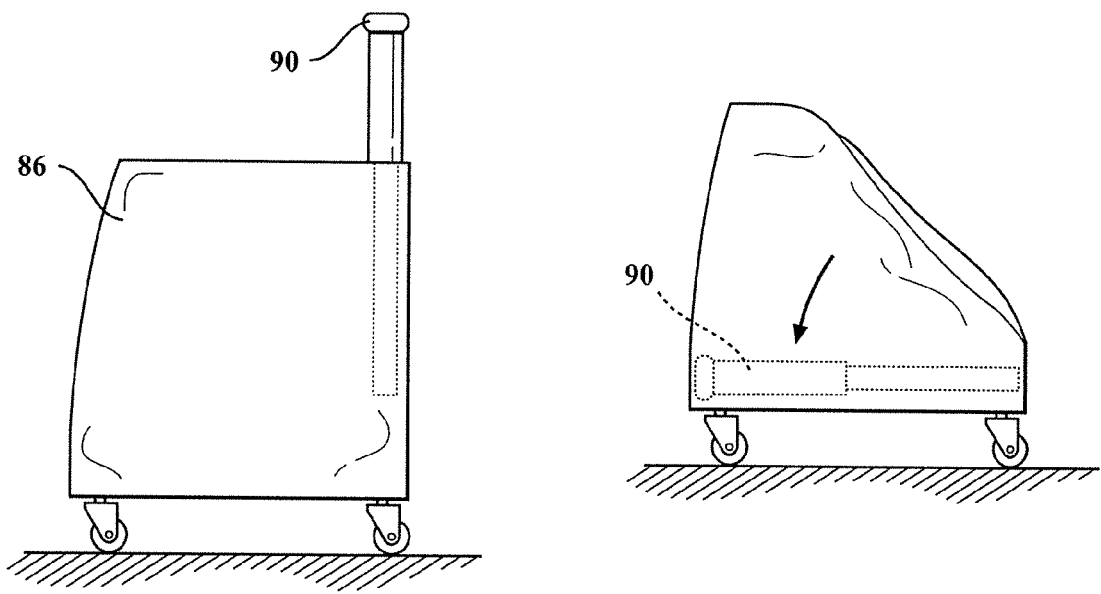
FIG. 11A
FIG. 11B
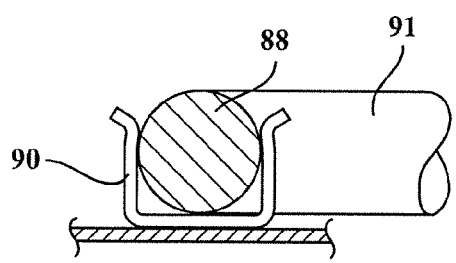
FIG. 11C
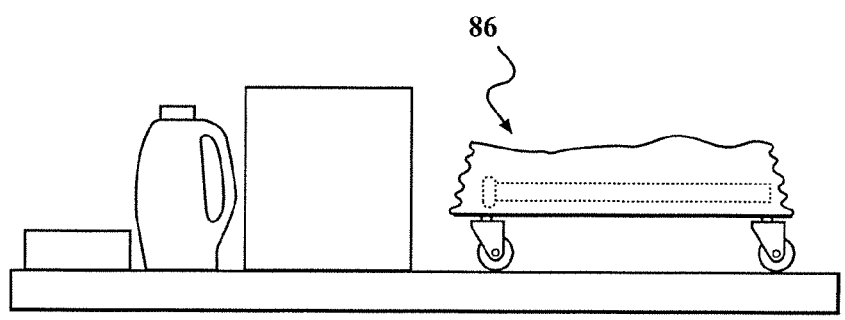
FIG. 11D

COLLAPSIBLE LAUNDRY AND ACCESSORY BASKET WITH WHEELED AND CARRYABLE CONFIGURATIONS

CROSS REFERENCE TO RELATED APPLICATIONS

The present application claims the priority of U.S. Ser. No. 61/892,915 filed Oct. 18, 2013, the contents of which is incorporated herein in its entirety.

FIELD OF THE INVENTION

The present invention relates generally to a convertible and collapsible multi-purpose enclosure, such including a wheeled and extendable handle in a first ground supported configuration (such as which can easily be manipulated for traversing an ascending stairway), a fold-up storage configuration and a further collapsible and shoulder strap extensible position enabling the enclosure to be carried in a still further configuration. The enclosure, such as which can be used in one non-limiting application as a laundry basket with provision for accessory storage, can also include volume/depth adjustable sides (such including fold over material which is held in place by attracting magnets or snaps). The collapsing/storage protocol can also include a number of different configurations for providing folding of the various sides with the base structure, this including the integration of a variety of different wire or like skeletal supports which enable the outer flexible (typically fabric) shell to be reconfigured into a minimal space to facilitate storage.

DESCRIPTION OF THE BACKGROUND ART

The prior art is documented with various types of collapsible laundry container structures. A first example of this is disclosed in Hsu, U.S. Pat. No. 5,761,858 and having a base, an upper frame, a cover body, four supporting frames, six engaging members, and a water-proof bag is disclosed. The four supporting frames are engaged with the base and the upper frame by rivets to form two pairs of two-story supporting frames, and further fixed by the engaging members stopped with recesses and insert grooves disposed at one lateral side of each supporting frame so as to expand tightly and evenly the water-proof bag outside the supporting frames. In dismantling, the two-story supporting frames are pushed inward from outside the water-proof bag at the spot of the engaging members with the capacity of collapsible fold so as to fold and store the supporting frames neatly upon the base with the upper frame overlaid above. In addition, circular holes are disposed at the base to boost the circulation of air and a corrugated flange is provided at the bottom of the base to form a stable footing for supporting the base on the ground.

A further example drawn from the existing art is the disposable standing trash bag of Doffs, U.S. Pat. No. 6,315,143, and teaching a flexible container supported by a foldable frame. The frame includes at least one pair of vertically stacked horizontal hoops and a plurality of vertical supports. The supports are pivotally connected to the hoops and fold radially inwardly when the trash bag is folded. A slider restrains folding of the vertical supports when the trash bag is standing but can be released by turning the frame upside down so that the trash bag can be folded for storage, shipment or reuse.

The collapsible storage device of Zhen, US 2010/0059514, teaches first and second flexible loop members, each loop member defining a closed loop and having a first side and an opposing second side, each loop member adapted to assume an expanded position and a collapsed position, with the two loop members overlapping each other at a first overlapping point along the first sides of the loop members, and at a second overlapping point along the second sides of the loop members. The loop members are adapted to assume a deployed position in which one loop member is disposed at an angle with respect to the other loop member at the overlapping points, so that the structure defines a top side, four vertical sides, and a bottom side when in the loop members are in the deployed position. The structure also includes a flexible wall extending across the four vertical sides and the bottom side to define an interior space.

The collapsible basket of Day, U.S. Pat. No. 1,148,761, teaches a wire frame collapsible basket having a rectangular rim frame and a rectangular bottom frame. A centrally disposed stay-bar has heads connecting the transverse stretches of the bottom frame, with U-shaped end frames in hinged connection with the transverse stretches of the rim frame. The free transverse bottom stretches of the end frames are bowed upwardly and adapted to yieldingly engage the stay-bar to constitute stretches when the basket is distended, movement of the bowed portions being limited by the stay-bar heads, and a flexible sheathing provided for the bottom, side and ends of the frame, the sheathing being secured to the rim frame member.

SUMMARY OF THE PRESENT INVENTION

The present invention discloses a wheeled enclosure having an interior volume defining body including a rigid base and a plurality of upwardly extending and flexible sides. A plurality of wheeled supports are incorporated into the rigid base. A perimeter establishing inner frame extends upwardly from the rigid base and provides structural support to the flexible sides, the frame being converted between upward expanded and inward collapsed positions. A telescoping handle further extends from a rear of the body.

Additional features include the handle being pivotally secured to an edge of the rigid base. The handles can further extend from upper locations of a pair of opposite sides of the body in order to establish a reclosable top to the volume defining body. An accessory supporting pocket can be secured to an exterior of at least one of the flexible sides.

Other features include the plurality of wheeled supports further comprising any of cylindrical or spherical shaped castors. The upwardly extending sides may each further include an end extending flap convertible between an inwardly folded position and an upwardly extending and increased height and interior volume defining position with any one of snaps, magnets or mechanical closures provided for restraining the flaps in the inwardly folded position. Inter-edge engaging portions are associated with each flap in the upwardly extending position.

Additional features include a pair of shoulder supporting straps secured to upper edges of the sides to facilitate carrying in a handle retracted and enclosure expanded position. The plurality of upwardly extending and flexible sides further comprising any a fabric material.

BRIEF DESCRIPTION OF THE DRAWINGS

Reference will now be made to the attached drawings, when read in combination with the following detailed description, wherein like reference numerals refer to like parts throughout the several views, and in which:

FIGS. 9A-9E illustrate an article supporting exterior pocket associated with the enclosure device along with a collapsing protocol associated with one non-limiting variant;

FIGS. 11A-11D depict a further collapsible protocol for the multi-purpose enclosure and incorporating snap-receiving locations for assisting in establishing a reduced volume stored configuration;

DETAILED DESCRIPTION OF THE PREFERRED EMBODIMENTS

As previously described, the present invention relates generally to a convertible and collapsible multi-purpose enclosure, such as in one non-limiting application functioning as a laundry basket, and including a wheeled and extendable handle in a first ground supported configuration (such as which can easily be manipulated for traversing an ascending stairway), a fold-up storage configuration and a further collapsible and shoulder strap extensible position enabling the enclosure to be carried in a still further configuration.

Additional features which will be discussed in further detail include provision for accessory storage, and which can also include volume/depth adjustable sides (such including fold over material which is held in place by attracting magnets or snaps). The collapsing/storage protocol can also include a number of different configurations for providing folding of the various sides with the base structure, beyond those described and illustrated herein, this in one non-limiting instance including the integration of a variety of different wire or like skeletal supports which enable the outer flexible (typically fabric) shell to be reconfigured into a minimal space to facilitate storage.

Figure 1:
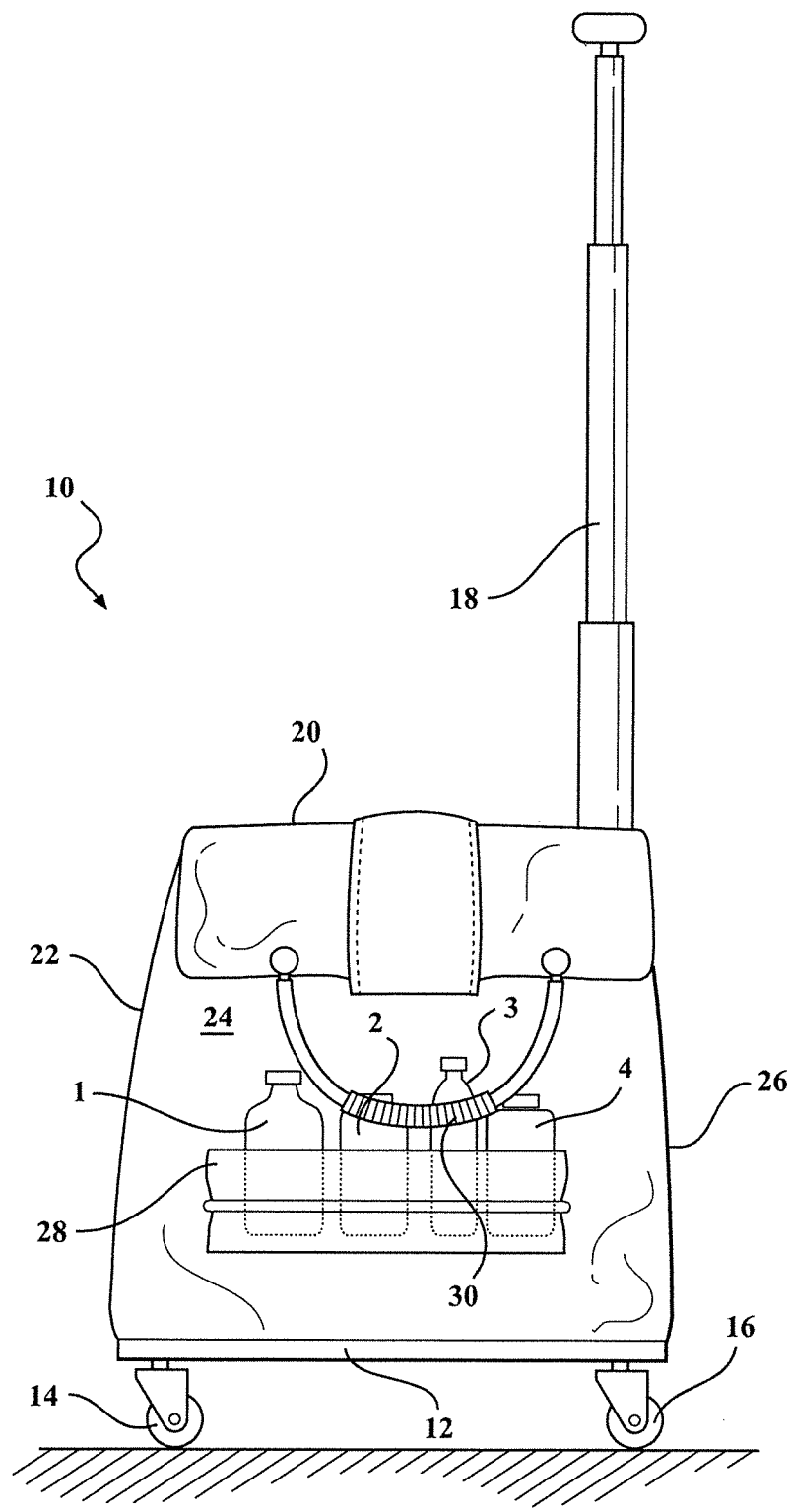
FIG. 1 is a plan view of the multi-purpose enclosure according to one possible configuration.

Referring initially to FIG. 1, a plan view is generally shown at 10 of the multi-purpose enclosure according to one possible configuration and which includes a multi-sided and flexible fabric outer body or shell which is supported upon a rigid (typically planar and rectangular shaped) base 12, from which extends underside supporting wheels or castors (a pair of which are exemplary shown at 14 and 16 in the plan illustration of FIG. 1). A multi-functional handle, generally at 18, is provided in secured relationship along one side of the body and, as will be described in additional detail, is constructed in one non-limiting variant of multiple inter-telescoping portions, and is further capable of being pivoted or folded in a number of different configurations between use and stored positions.

Also shown in FIG. 1 is a top or lid 20 which can be supported upon the open rim defined by the sides (see as shown at 22, 24 and 26 in FIG. 1 with a fourth side hidden from view) to selectively reveal an volume defining interior. Further depicted is a side pocket which is shown as an expandable fabric layer 28, sewn or otherwise affixed along its sides and bottom to the indicated side 24 of the shell or body, and which is adapted to support any number of containers or accessories (see at 1, 2, 3, and 4), such as including laundry soap, bleach, etc.

Figure 6A:
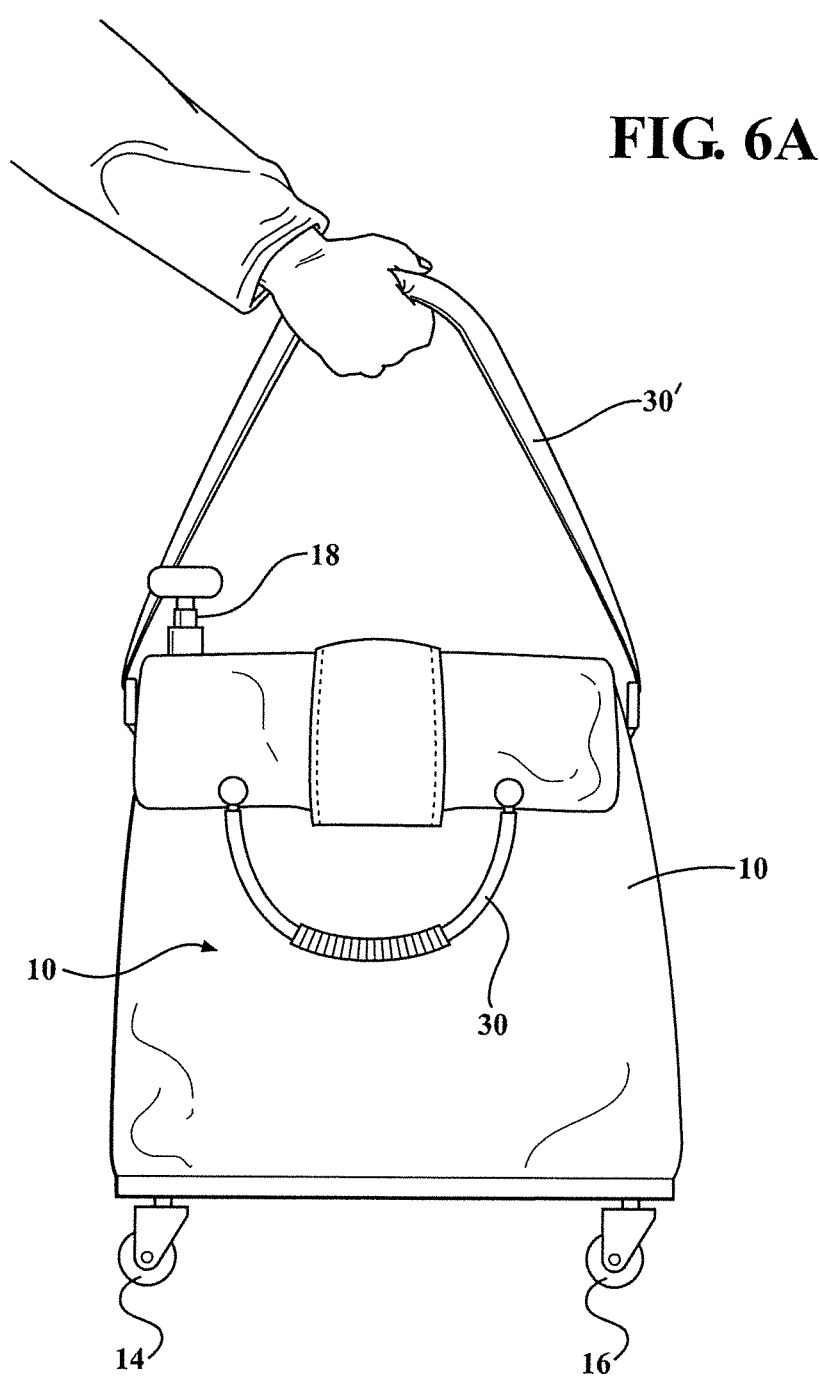
FIG. 6A is a first environmental view of a convertible and shoulder strap carryable variant associated with the multi-purpose enclosure device.
Figure 6B:
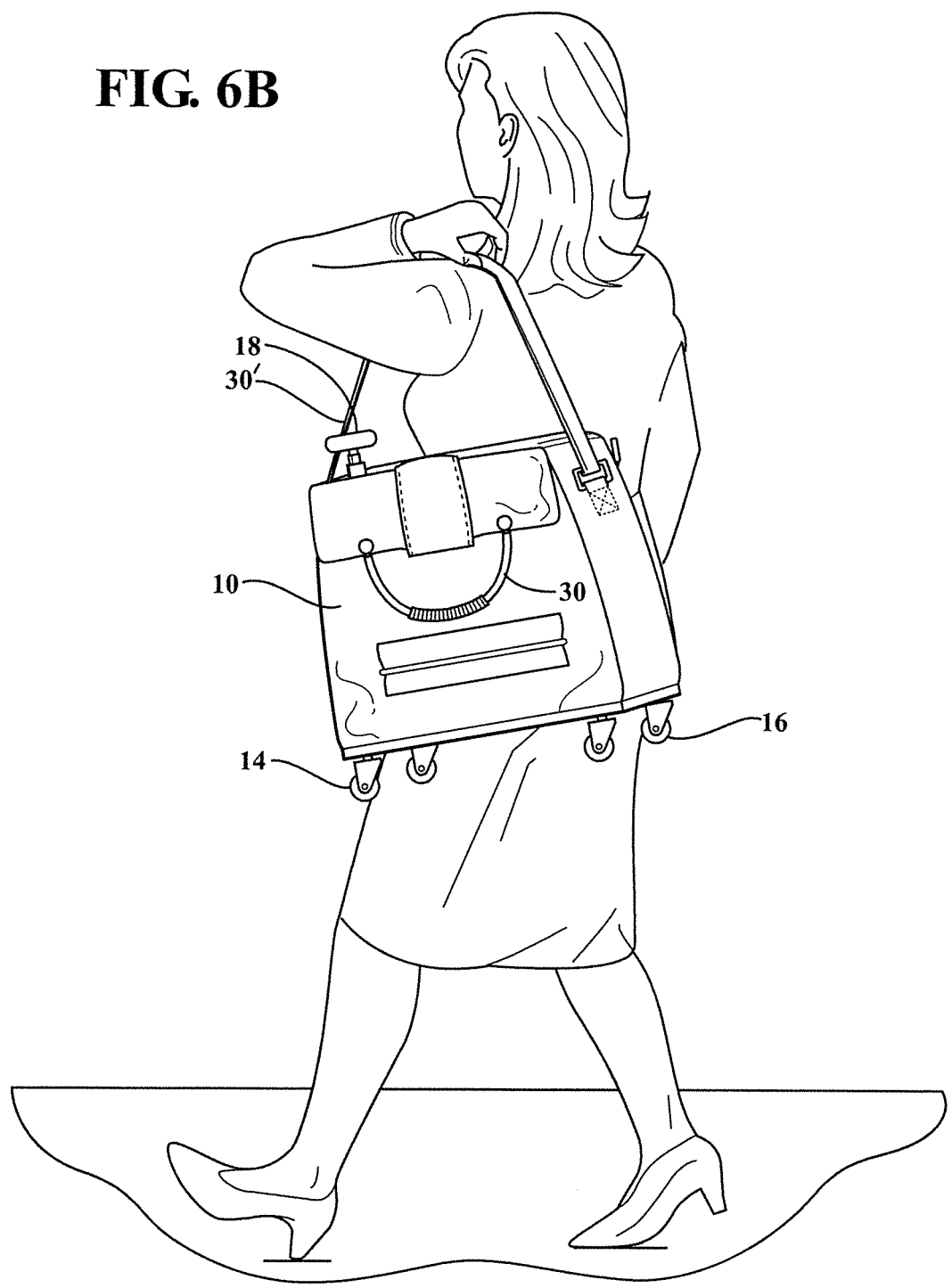
FIG. 6B is a further environmental view based on the device of FIG. 6A.

Also depicted is a carrying strap 30 affixed at locations proximate an upper edge of the indicated side 24 (with an identical strap typically mounted to an opposite and hidden side of the body). As will be further described and illustrated, the straps function in a carry-able converted configuration of the enclosure (see as shown in FIGS. 6A-6B) in which the telescoping handle 18 is retracted and then folded to a closed position.

Not shown in FIG. 1 but which will be described in further detail are the features of a collapsible interior skeleton (articulating frame), this supporting the interior of the flexible fabric shell and which enables the assembly to be converted between the expanded use position of FIG. 1, the fold up and stored position of FIG. 8 and the modified shoulder carry-able position of FIG. 6. The manner in which the interior supporting frame/skeleton is configured and inter-connected is open to modification and it is further understood that the illustrations referenced herein depict selected and non-limiting examples of the enclosure design and which can also be modified for other applications and purposes within the scope of the present disclosure.

Figure 2:
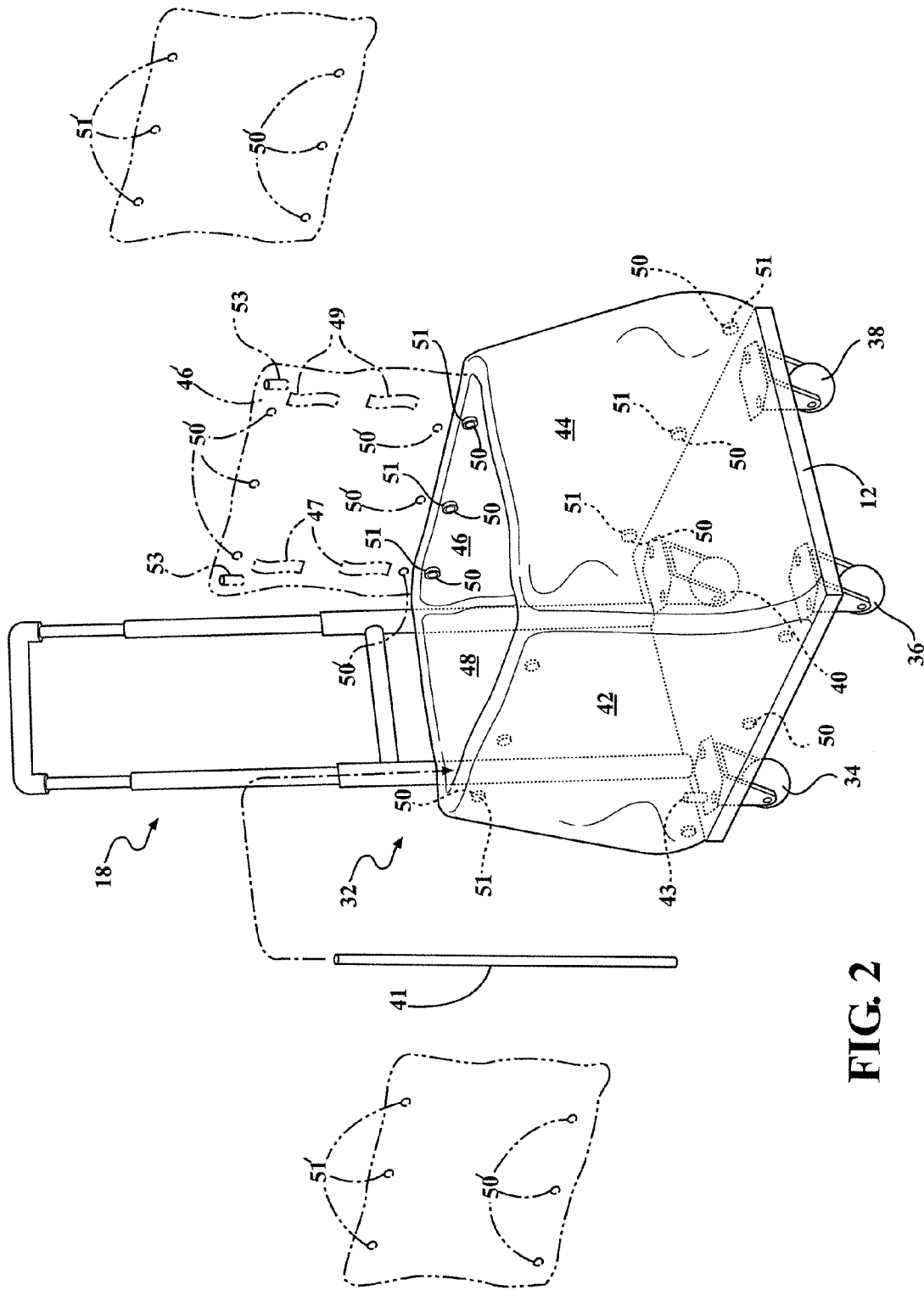
FIG. 2 is a rotated and partially phantom view of the enclosure of FIG. 1 with the top removed and better illustrating features such as the roller supported base and magnetically supported fold-in sides for facilitating depth adjustment.
Figure 16B:
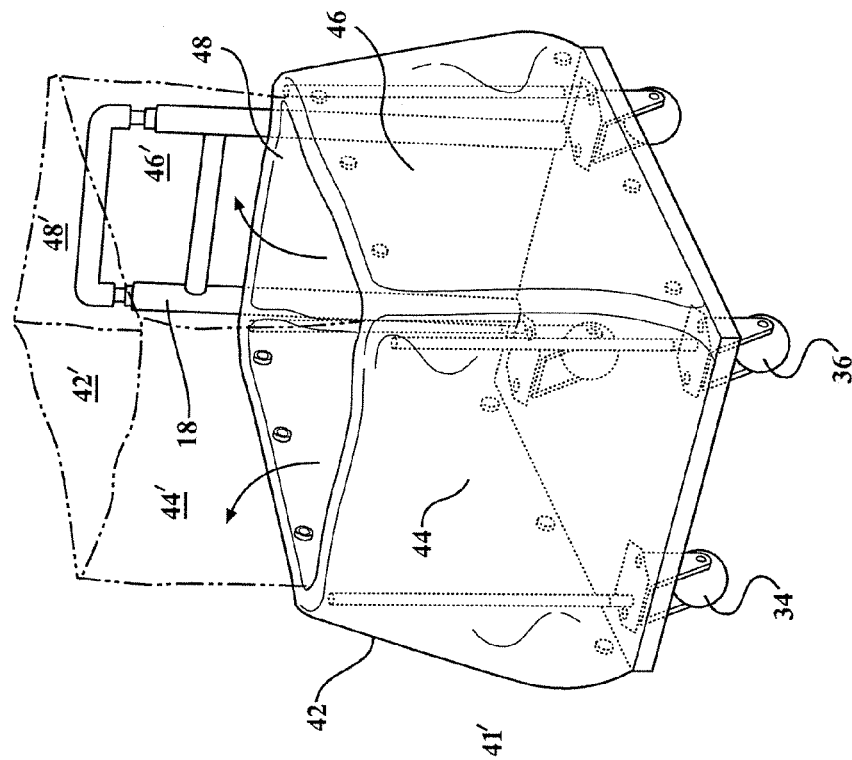
FIGS. 16A-16D present additional related views depicting the expandable nature of the item holding enclosure similar to as shown in FIGS. 2 and 14.

Referring to FIG. 2 (as well as by extension FIGS. 16A-16B), a rotated and partially phantom view is shown of a variation 32 of the enclosure of FIG. 1 with the top removed and better illustrating features such as a modified roller supported base, in this instance illustrated as a set of castors 34, 36, 38 and 40 (it being understood that any arrangement of wheels, rollers and the like can be substituted without departing from the scope of the invention). The inner skeletal support is also removed in FIG. 2, and in order to better depict a variation of the shell body including magnetically supported and fold-in upper extending sides or flaps (see at 42', 44', 46' and 48' as best shown in FIG. 16B and which correspond to sides 42, 44, 46 and 48) and in which the flaps are any of integrally formed with the upper edges of the base sides 42-48 or further can be zipper attached or attached by hook and loop fasteners (not shown) or otherwise secured for facilitating depth adjustment of the open enclosure.

In particular, the interconnecting sides can exhibit any length and which, upon detaching the inner folded portions (also again termed flaps) associated with each of the sides 42-48, this further depicted by unseating selected magnets (such as shown at 50) which are sewn into each of upper and lower most edges of the folded over side flaps. Further selected magnets, shown at 51, are sewn into the fabric defining each of the interconnected lower sides 42, 44, 46 and 48, such that the magnets can extend in spaced fashion proximate the top and bottom margins of the sides and which mate and attract with a like arrangement of magnets 50 sewn or otherwise adhered to the flaps which engage the lower sides such that, upon separation of the magnets 50 from those at 51, the side flaps 42', 44', 46' and 48' can be upwardly displaced in order to extend a functioning height of the enclosure.

Although not shown, it is further understood that the construction of the body 32 includes a suitable skeletal or inner frame support which extends along each inner corner of the enclosure and which can be likewise can be expanded to accommodate the upwardly folded sides in an increased volumetric holding configuration. One example of a height establishing corner support structure is partially depicted by stem 41 which can be separately provided and installed in vertically extending fashion within the interior of the enclosure in the manner shown by associated directional arrow so that the stem 41 seating within a bottom inside corner located collar 43, this in order to provide a height extending support structure.

In use, a plurality of four corner located stems 41 are provided and, without limitation, these can also include individual telescoping and collapsible portions for facilitating ease of storage when not in use, such further contemplating the stems 41 being integrated into the four sided vertical extending corners of the bag enclosure and which can be extended to their vertically extending maximum lengths upon upwardly extending the folded in flaps associated with each of the four interconnecting sides of the enclosure body.

The inner folded flaps associated with each of the four interconnected and lower body defining sides can also extend separately from each interconnecting edge of the lower/main body portion of the shell (a selected flap 46' associated with side 46 being shown in phantom), such as again by separating the magnetic adhering locations which can also be substituted by snaps, buttons, tab and slot, hook and loop fasteners and the like. It is further understood that each of a series of four upper side edge extending and fold-up flaps can be interconnected in vertically extending fashion in a number of different fashions, such as including by hook and loop (Velcro as further shown in phantom at 47 and 49 associated with the extending edges of each flap) and which, when upwardly folding all four side flaps, are interconnected in vertical edge to edge extending fashion, along with upper ends of the vertically affixed stems 41 seating into additional upper end collars (such as shown in phantom 53 associated with the upwardly separated fold in flap 46'). It is also envisioned that other suitable inter-edge engaging fasteners can be associated with the vertical extending edges of each upwardly folded side extending flap, and in order to secure the flaps together in elevating fashion.

FIGS. 16A-16B again present additional related views depicting the expandable nature of the item holding enclosure 32 similar to as shown in FIGS. 2 and 14, and again including pairs of overlapping magnets associated with the fixed sides and the fold-in and upwardly extendable flaps, further depicted at each of 42', 44', 46' and 48' in relation to their associated base sides 42-48. The rear handle 18 is as previously described and additional rigid vertical supports 41' can be located along each of four corners which are extended to provide elevated support to the upwardly folded side flaps 42'-48'.

Figure 16A:
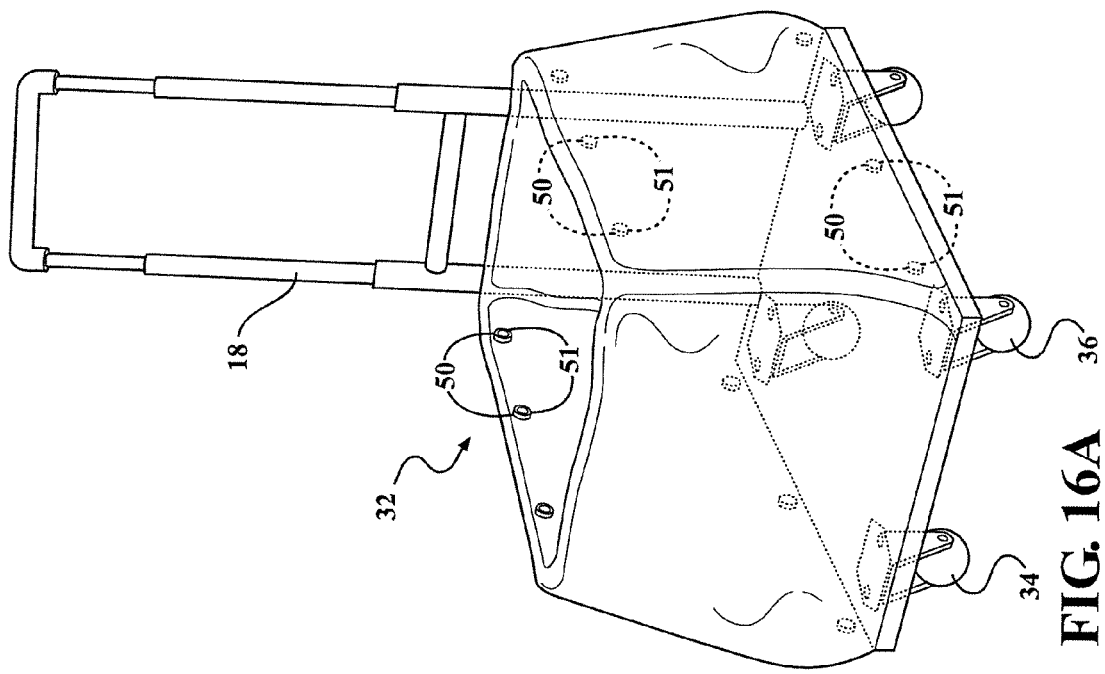
Figure 16D:
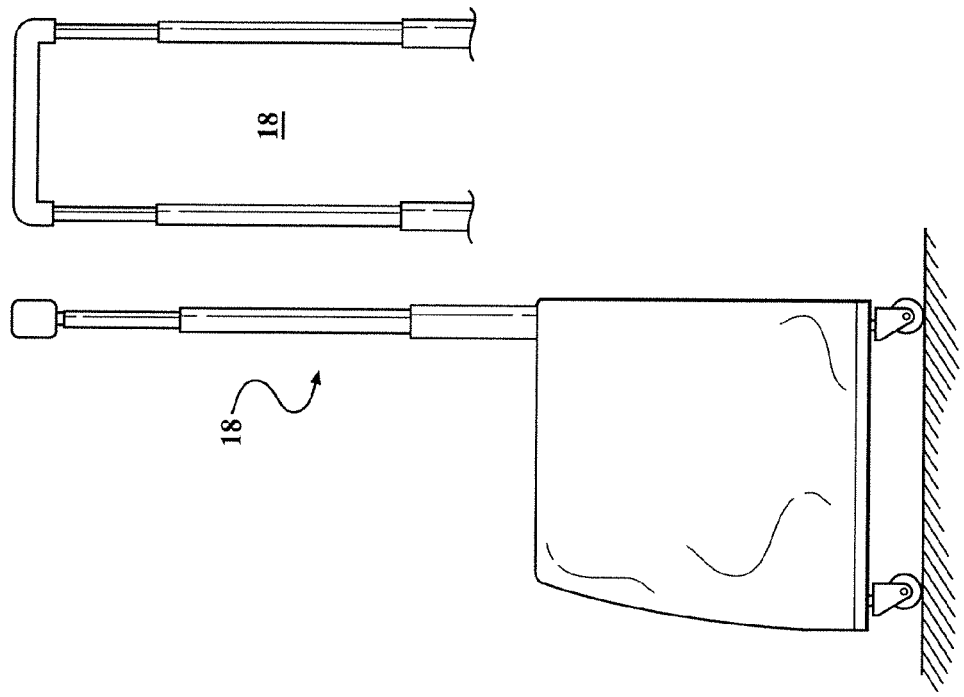
Figure 16C:
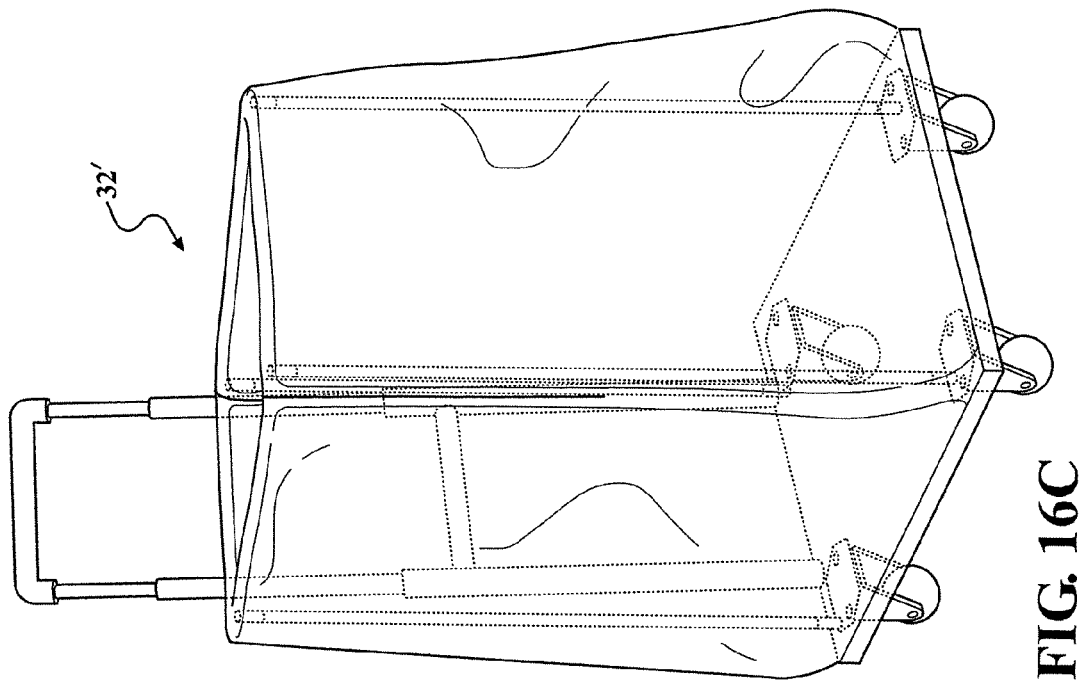

FIGS. 16C-16D depict a taller/deepened variation 32' of the enclosure of FIG. 2 and FIGS. 16A-16B, albeit with a similar construction such that a repetitive description of identical features, including fold up flaps, inner vertical support structures, hook and loop fasteners for securing the opposite edges of the upper flaps (all of which are previously described in FIG. 2) is unnecessary.

Figure 3A:
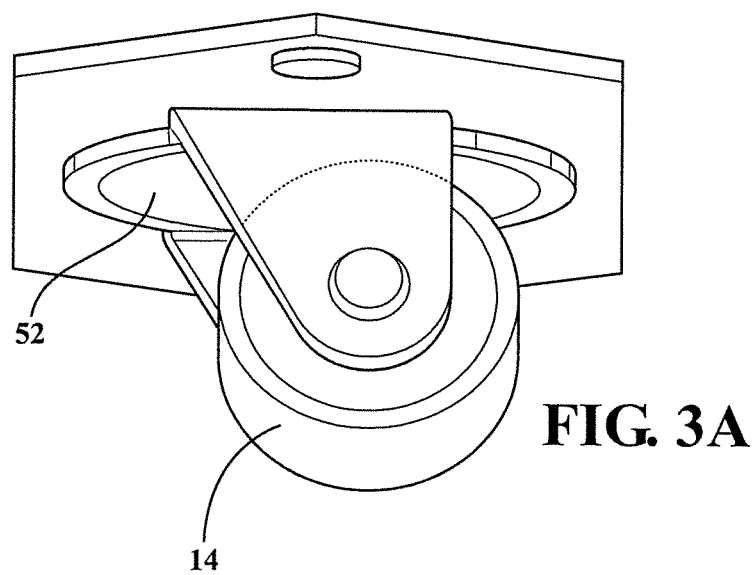
FIGS. 3A-3C present a series of views of examples of different wheels or castors for providing traversable support for the multi-purpose enclosure.
Figure 3B:
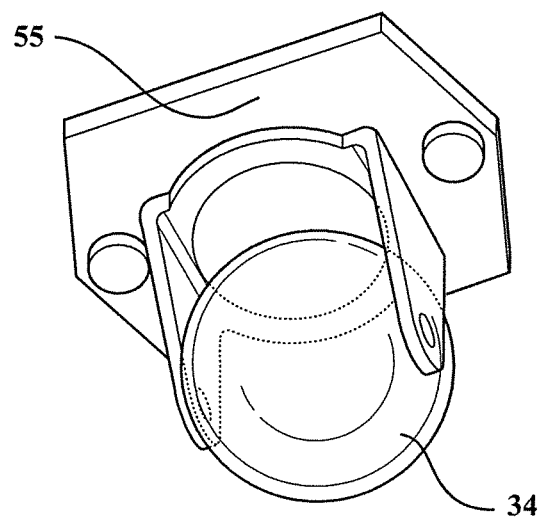
Figure 3C:
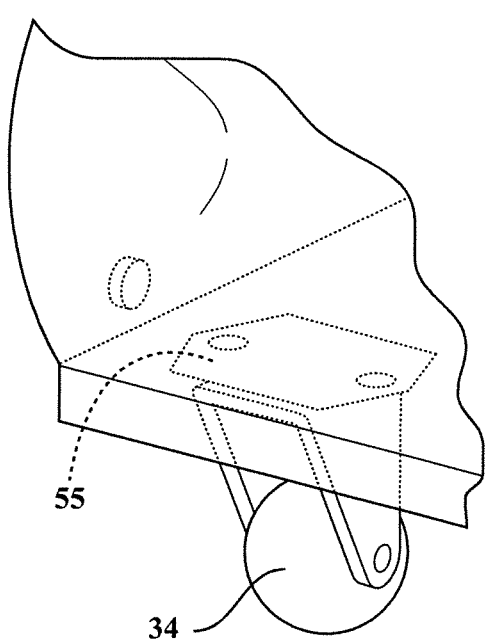

FIGS. 3A-3C present a series of views of examples of different wheels or castors, e.g. such as again depicted at 14 and 16 in FIG. 1 for FIG. 3A and at 34-40 in FIG. 2 for FIGS. 3B-3C, this for providing traversable support for the multi-purpose enclosure. In the instance of the enclosure assembly view of FIG. 2, each wheel or castor 34 exhibits any of a spherical configuration which provides multi-directional support to the enclosure 32. Further shown in FIGS. 3A-3C are non-limiting types of wheel support brackets, e.g. at 52 in FIG. 3A to facilitate the mounting of the wheel 14 to the rigid underside 12 of the enclosure base, as well as further at 55 in FIGS. 3B-3C for likewise supporting roller/casters such as depicted at 34.

Figure 4A:
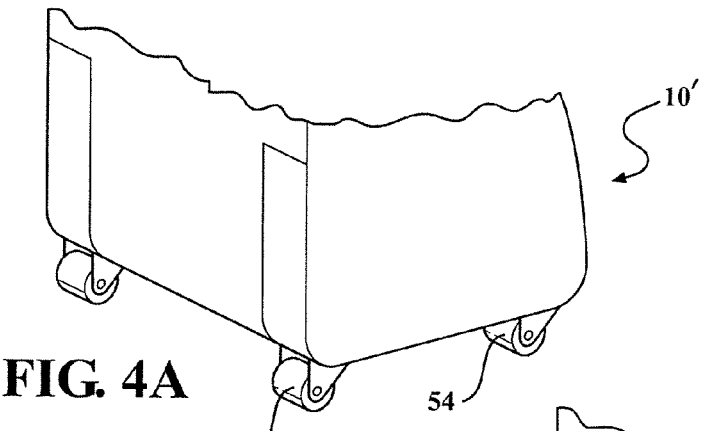
FIGS. 4A-4D illustrate further examples of wheels/castors which can be integrated into the multi-purpose enclosure.
Figure 4B:
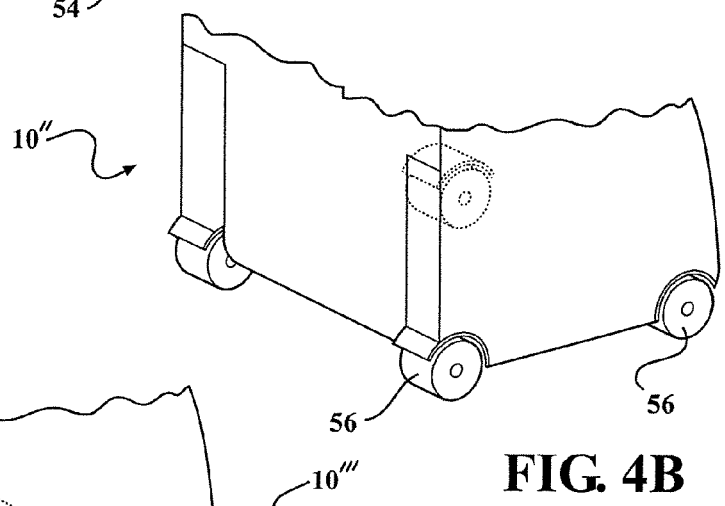
Figure 4C:
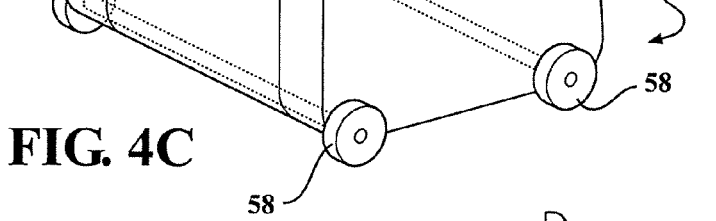
Figure 4D:
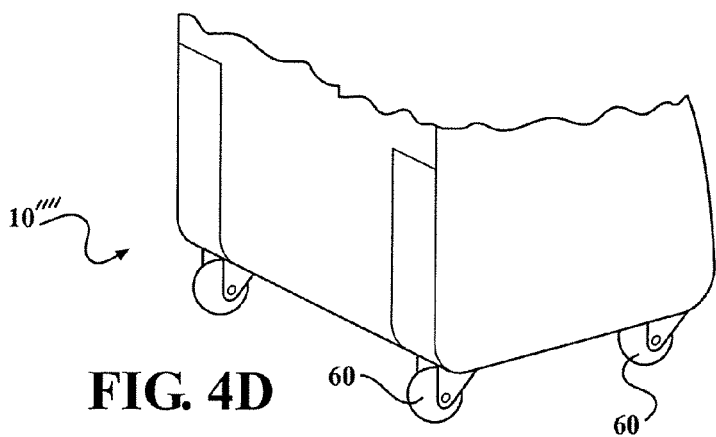

FIGS. 4A-4D illustrate further non-limiting examples of wheels/castors which can be integrated into the multi-purpose enclosure, such as generally depicted at 10', 10'', 10''', and 10'''' in each of the succeeding illustrations of FIGS. 4A-4D. Specifically, FIG. 4A illustrates a set of cylindrical shaped wheels 54, FIG. 4B larger diameter sized wheels 56, FIG. 4C an outside positioned set of wheels 58 and, finally, FIG. 4D a set of spherical or rounded wheels/castors 60 similar to that shown in FIGS. 2-3. Without limitation, the configuration and placement of the wheels, axles or other rotatable supports can be easily modified without departing from the scope of the invention.

Figure 5A:
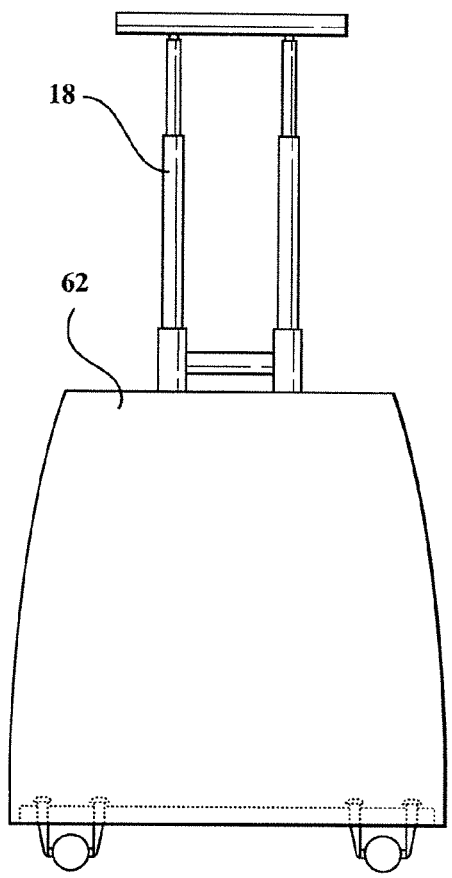
FIG. 5A is a plan view of the multi-purpose, transportable and collapsible enclosure device in a use position.
Figure 5B:
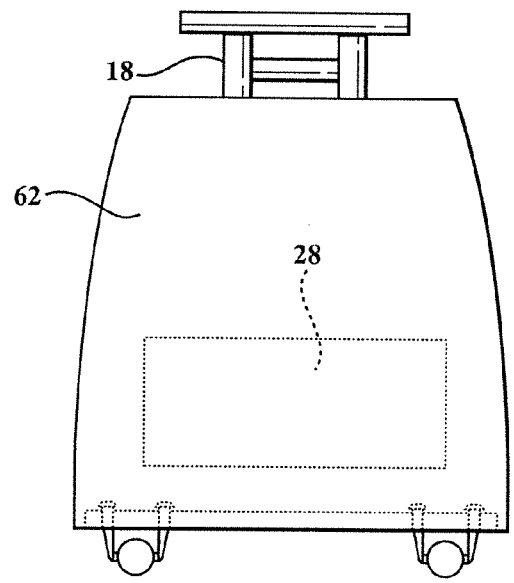
FIG. 5B is a succeeding view to FIG. 5A and showing the transportable and multi-purpose enclosure in a handle retracted position.
Figure 5C:
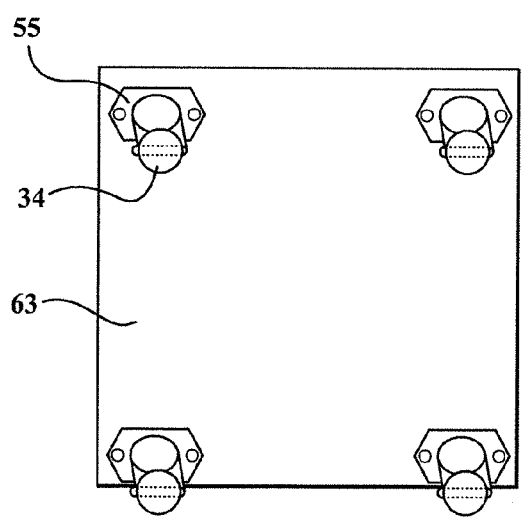
FIG. 5C is a bottom view of the device of FIG. 5A.
Figure 5D:
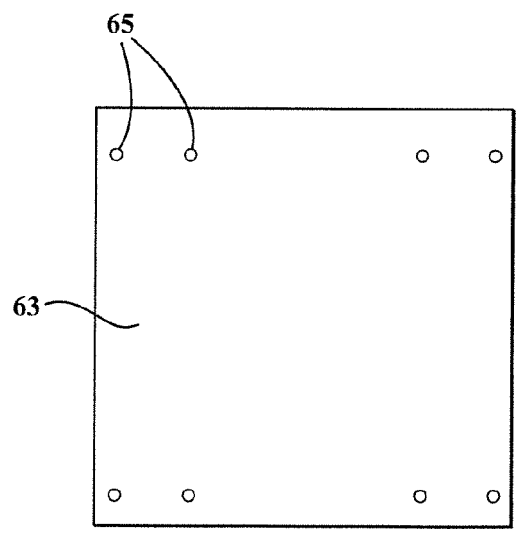
FIG. 5D is a bottom view similar to FIG. 5C with the wheels or castors removed.

Proceeding to FIGS. 5A-5H, presented are a succession of additional views of the enclosure and collapsing/telescoping handle (such as previously shown in FIG. 1). Specifically, FIGS. 5A-5B depict plan views of a wheel supported body 62 with telescoping handle 18 in each of extended and collapsed positions. FIGS. 5C-5D depict first and second sectional views of a rigid bottom 63, associated with the body 62. FIG. 5C illustrates the round castor wheel 34 of FIG. 3C with mounting bracket 55, with FIG. 5D illustrating the wheel and bracket removed and leaving pairs of mounting apertures 65.

Figure 5E:
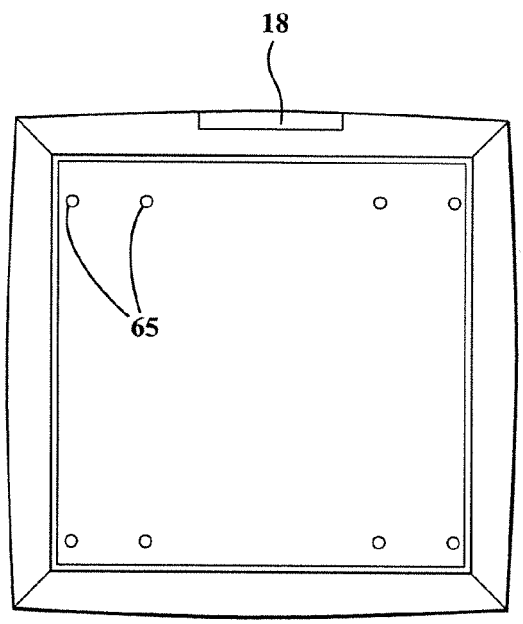
FIG. 5E is an open top plan view of the device of FIG. 5A.
Figure 5F:
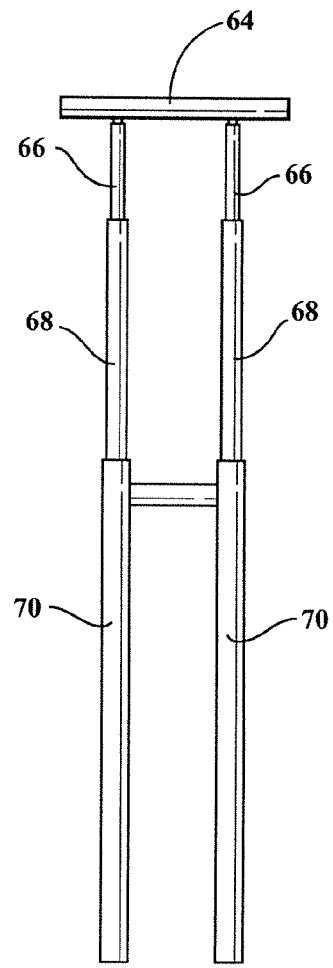
FIGS. 5F and 5G respectively present sectional extended and retracted views of the handle portion of FIG. 5A.
Figure 5G:
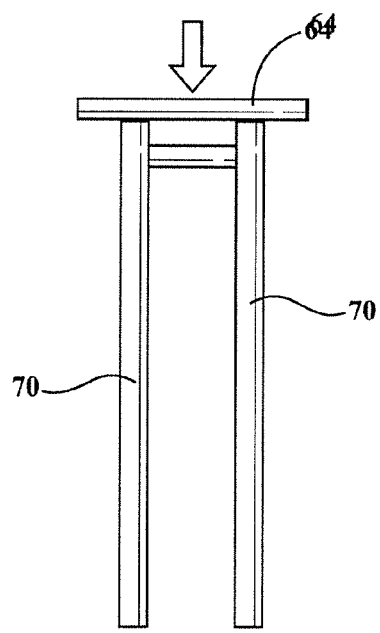
Figure 5H:
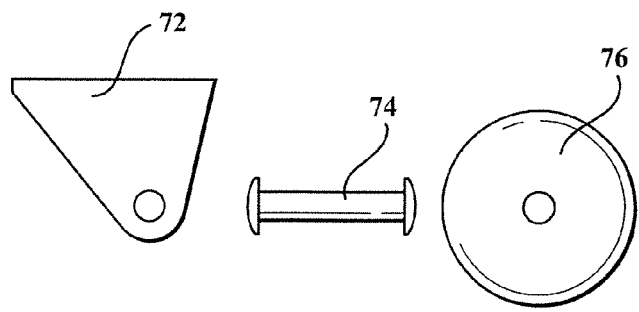
FIG. 5H is an exploded view of a selected wheel or castor subassembly mounted to an underside location of the rigid bottom of the device of FIG. 5A.

Also shown in FIG. 5B is the provision of a storage pocket (such as previously depicted at 28 in FIG. 1). FIG. 5E is an open top view looking down and within the interior of the enclosure. FIGS. 5F-5G depict the collapsibility aspects of the handle (see also arrow in FIG. 5G), such further including a top/cross bar 64 mounted to a first pair of spaced apart vertical members 66, with additional telescoping members 68 and 70 providing tubular and structural support to the handle sub-assembly.

As further understood, the handle is mounted to the enclosure body such as via anchoring the lower most tubular supports 70 in affixed fashion to the rigid base of the enclosure as also shown in FIG. 2. Without limitation, the telescoping handle construction can include a hinged or pivot mount to facilitate folding of the handle during either storage or conversion to a should strap carrying configuration. Also shown in FIG. 511 in exploded fashion is the structure of a wheel/castor subassembly according to one non-limiting configuration, this exhibiting an underside bracket 72 (typically dual spaced layer), a pin 74 and a wheel 76 (cylindrical, spherical or otherwise modified), the application of which is not limited to those variants previously described.

Figure 7:
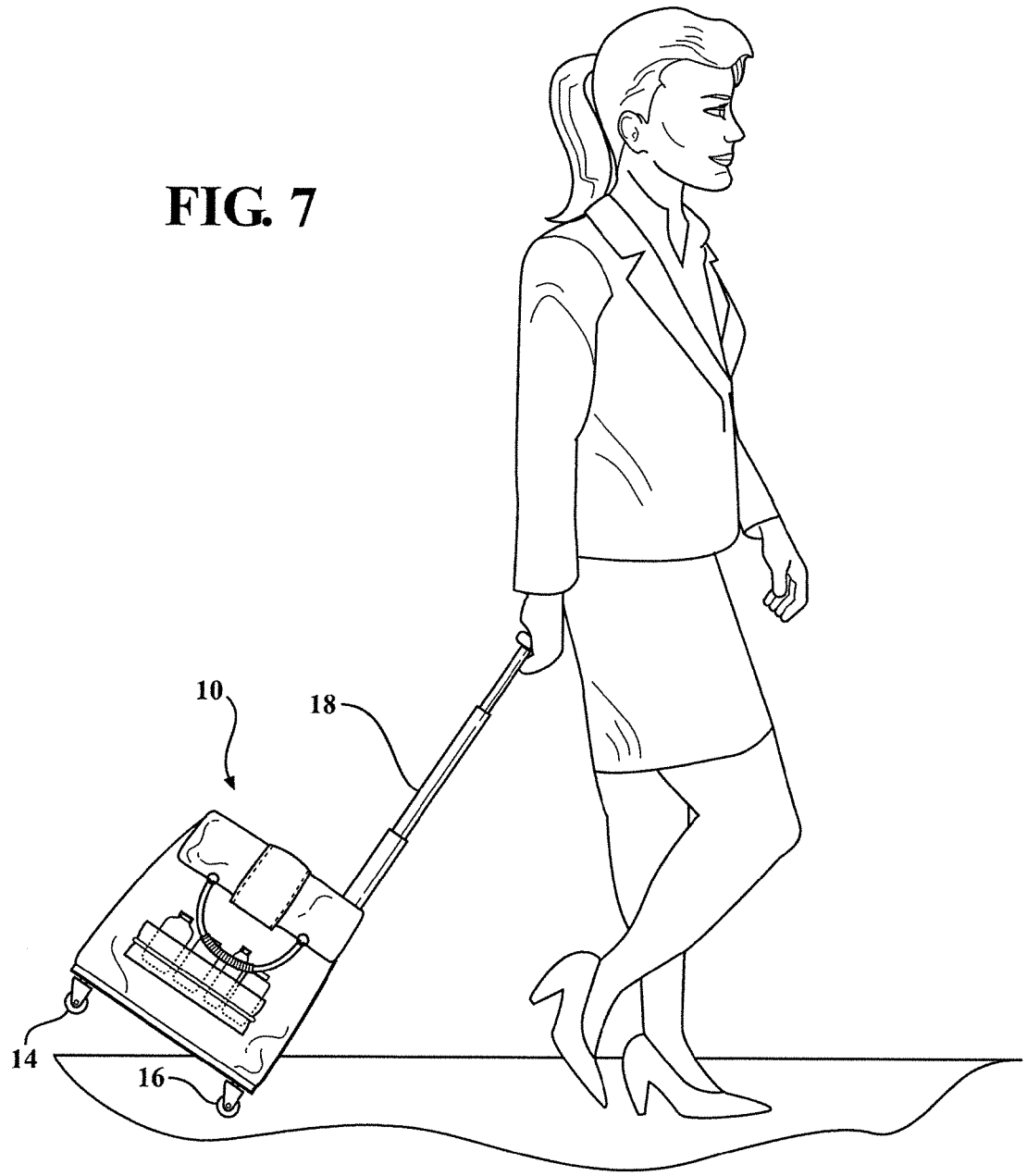
FIG. 7 depicts the present device in a ground supported and wheeled/traversable environmental configuration.

FIGS. 6A-6B present a pair of environmental views of a convertible and shoulder strap carryable variant associated with the multi-purpose enclosure device (such as previously shown at 10), the understanding being that the telecoping handle 18 is converted to a collapsed/retracted or inwardly folded configuration and the shoulder straps 30 or 30' are utilized in differing carrying configurations. FIG. 7 further depicts the present device 10 in a ground supported and tilted/wheeled/traversable configuration. FIG. 8 depicts the enclosure 10 in a fully folded and stored configuration, such also depicting a fold over Velcro strap or the like (see at 11) which can be built into the sides and/or bottom of the enclosure to assist in maintaining the assembly in the collapsed position.

FIGS. 9A-9E build upon the prior disclosure (such that previously defined elements are not repetitively described) and further illustrate a variation 78 of the enclosure assembly again depicting an article supporting exterior pocket, shown in this variant at 80, associated with the enclosure device along with a collapsing protocol associated with one non-limiting variant. This includes a likewise retractable handle with telescoping portions 80, 81 and 83.

Figure 8:
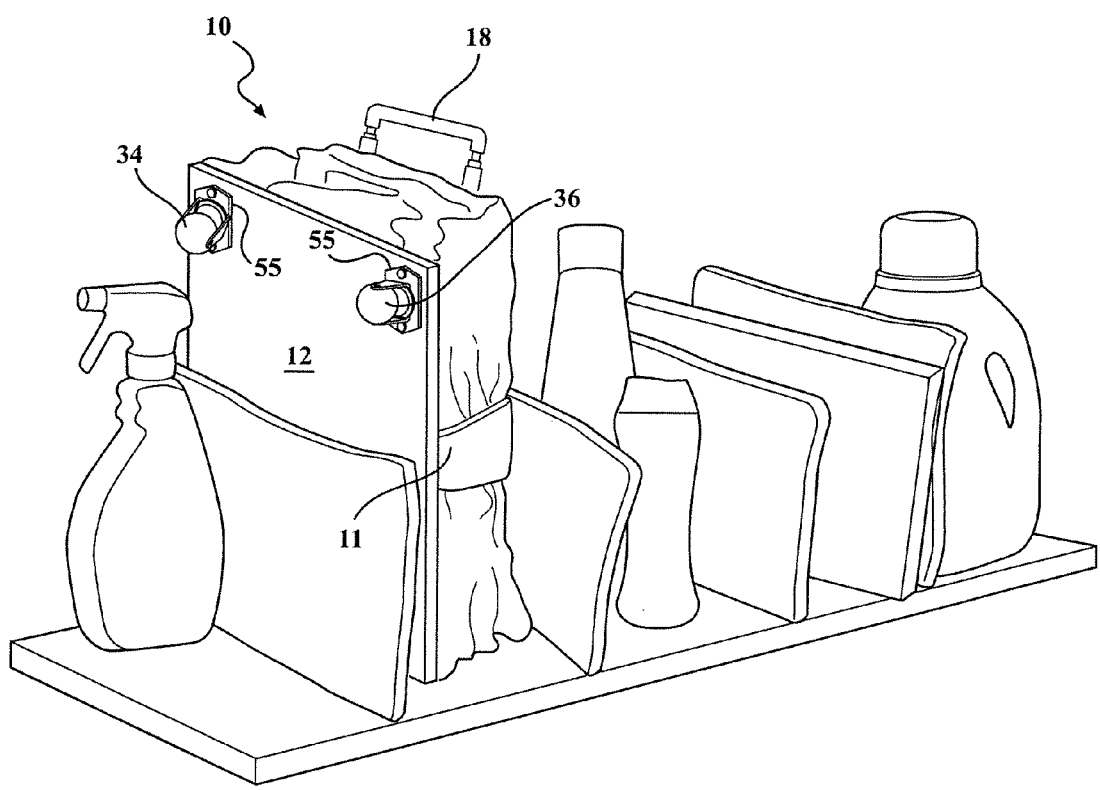
FIG. 8 depicts the enclosure in a fully folded and stored reconfiguration.
Figure 9E:
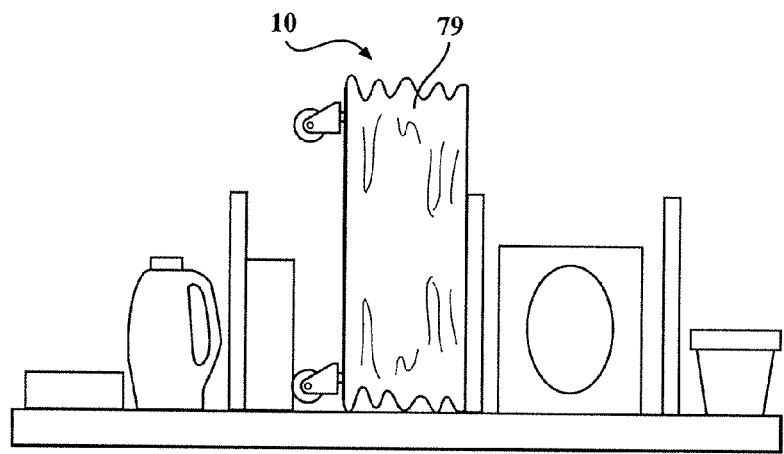

A unique aspect of the enclosure assembly 78 is the ability to downwardly/inwardly collapsible an associated frame or skeletal support structure (see FIG. 9C), this enabling the assembly to be converted from a use (FIGS. 9A-9B) to compressed to a substantially fully collapsed position (FIG. 9D) in which the assembly is capable of being stored (FIG. 9E as well as previously depicted FIG. 8). In order to facilitate collapse of the enclosure, the outer skin or fabric (at 79 in FIGS. 9C-9D) is provided as a flexible membrane surrounding a suitably configured and inter collapsible frame, such as further including both vertically extending corner supports and intersecting and slidably/telescopically disposed supports for facilitating inward/downward collapse of the structure upon engaging a release lever or tab and in the manner depicted.

Figure 10A:
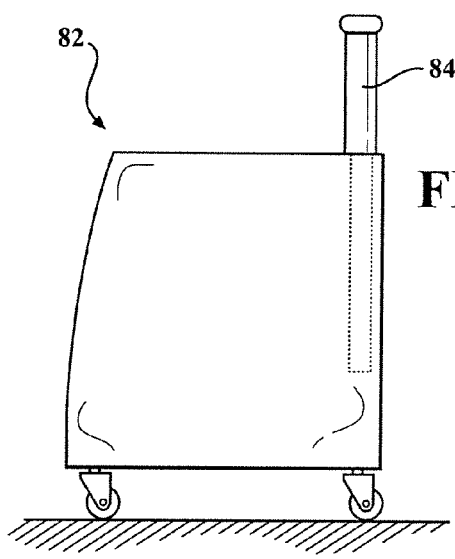
FIGS. 10A-10C depict a further protocol for effectuating inwardly folding collapse of the enclosure and depicting the manner of storing the telescoping handle.
Figure 10B:
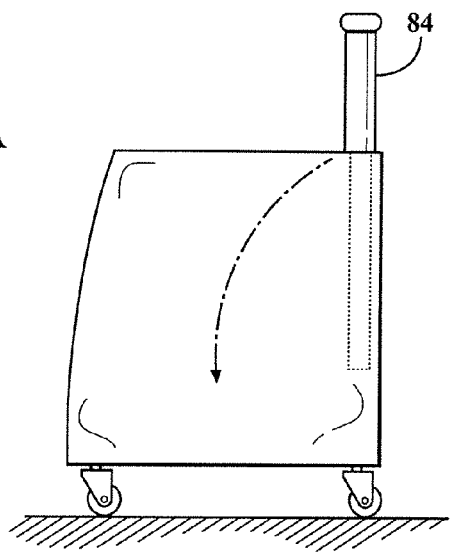
Figure 10C:
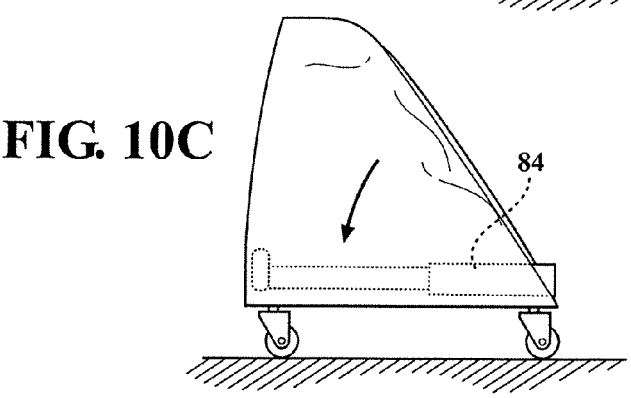

FIGS. 10A-10C depict a further protocol for effectuating inwardly folding collapse of a further variant 82 of enclosure, in this instance integrating a variation 84 of a telescoping handle which is hingedly mounted at its base to facilitates inwardly folding thereof (FIG. 10C) in order to assist in an inwardly collapsing protocol of the flexible bag, enclosure or shell in the manner shown. In this fashion, the skeletal structural support can be reconfigured in order to provide for progressive or simultaneous inward collapsing of the supported sides inwardly in the fashion shown and in order to achieve the collapsed position. A suitable disengagement linkage is again contemplated and can also be triggered by inward pivoting of the handle 84 in order to collapse the supporting frame in the manner shown, and by which the bag folds inside of the enclosure concurrent with the handle being pivoted from an upright vertical use position to a horizontal collapsed storage position. The inwardly folding aspect of the bag enclosure sides can be accomplished in combination with the downward pivoting of the interconnected sides and the rear telescoping handle support 80 in the manner shown, such as in combination with a flexible outer bag structure similar to as shown at 79 in FIG. 9C-9D.

FIGS. 11A-11D depict a further collapsible protocol for a multi-purpose enclosure, as generally depicted in the various illustrations of FIGS. 9-10, having such as a flexible body 86 and which incorporates snap-receiving locations, see for example ball 88 and receiving engagement locations 90 depicted in FIG. 11C and which can be located along the bottom inside of the bag, this for assisting in establishing a reduced volume stored configuration. A handle assembly 90 inwardly telescopes and then pivots/folds in the manner shown in FIG. 11B and, upon collapsing the supporting frame and flexible bag/shell, the assembly 86 can be stored as shown in FIG. 11D. In this fashion, a plurality of elongated portions, such as at 91, can again define upwardly extending inner frame supports of the bag enclosure and which, upon being folded downwardly, snap engage against such as a rigid bottom of the enclosure in order to define the collapsed position of the bag as substantially depicted at 86 in FIG. 11D. During this protocol, the bag 86 again progressively collapses inwardly and downwardly in a successive fashion in order to define the collapsed article of FIG. 11D.

Figure 12A:
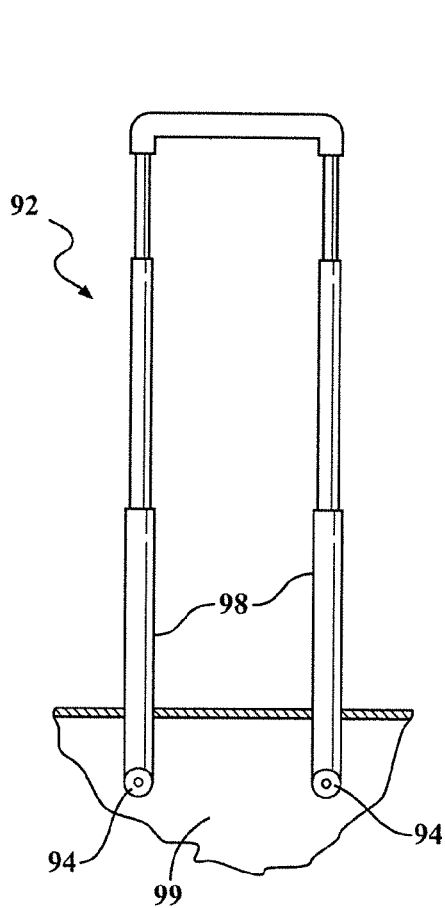
FIGS. 12A-12C depict three variations of a collapsible/telescoping handles associated with the present invention.
Figure 12B:
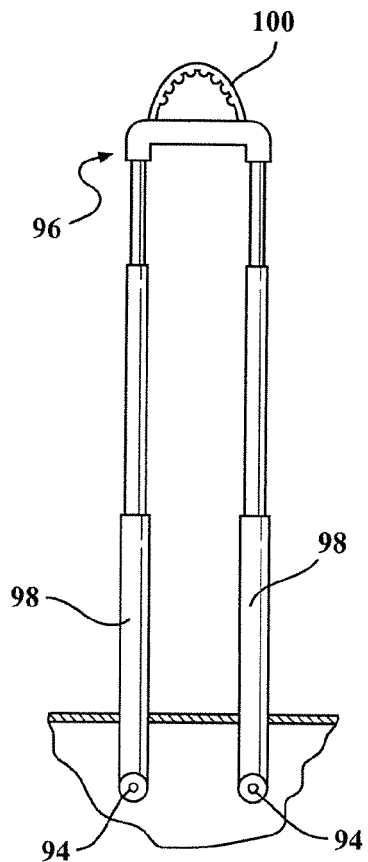
Figure 12C:
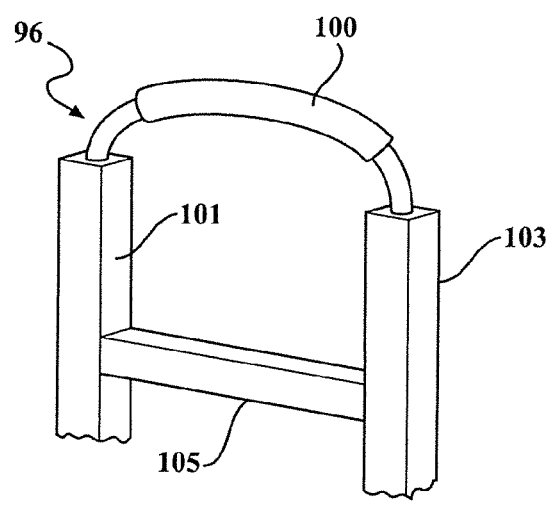

Proceeding to FIG. 12A, a further related version of the handle subassembly is generally shown at 92 with base supports 94 which can also be hinged or otherwise configured so that, upon engaging a catch or trigger, facilitates articulation of the handle 92 relative to the supporting structure of the enclosure. As further shown in FIG. 12B, related handle subassembly 96 can include more narrowly configured tubular supporting portions 98 to establish a narrower width of the handle, and further exhibits an end-most mounted and flexible gripping portion 100 which is again shown in the enlarged upper end view of a further related sub-variant in FIG. 12C in which the uppermost flexible gripping portion 100 is integrated into a rigid handle construction include vertical side portions 101 and 103 and horizontal bottom portion 105. In each of these sub-variants, the base supporting portions 98 of the handles can further be designed such that they are recessed or embedded within such as rigid rear surface 99 portion associated with the body or secured in another fashion which provides both ease of use and ease of storage.

Figure 13:
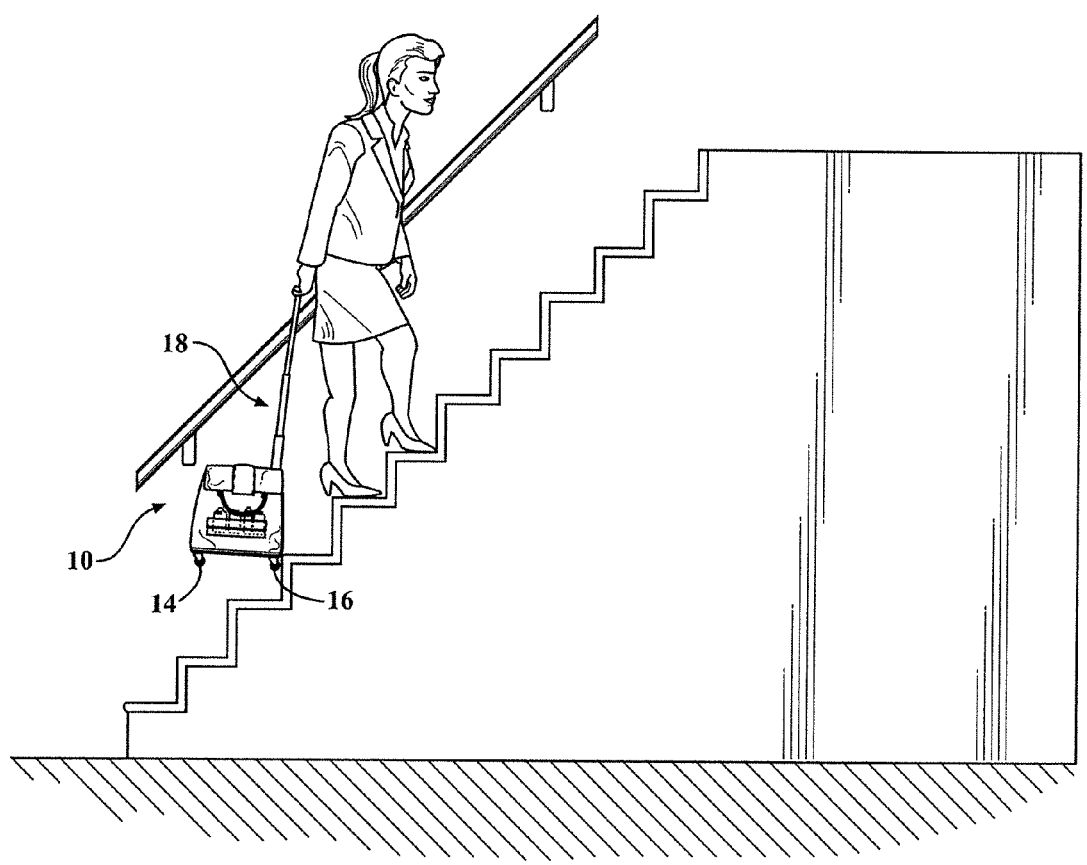
FIG. 13 is an environmental depiction of the wheeled and ground supported enclosure with handle for assisting a user in ascending a stairway.

FIG. 13 depicts an environmental view of the wheeled and ground supported enclosure with handle for use by an individual in ascending a stairway and is intended to demonstrate the manner in which the assembly is utilized to facilitate ascending (as well as traveling in a downward direction) a stairway. This is accomplished by the body 10 being either dragged along the vertical risers and horizontal interconnecting surfaces of the stairs, or by tilting the body in order to utilize the bottom surface rollers 14 and 16 to provide a convenient traversable device.

Figure 14A:
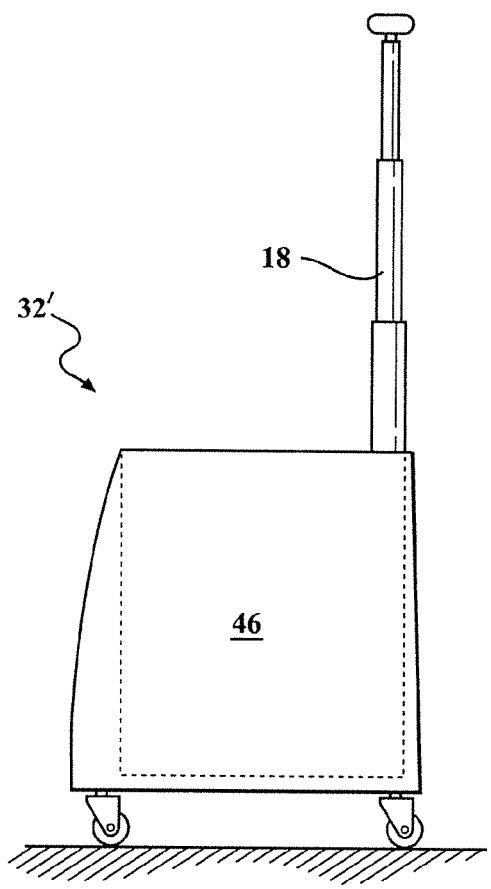
FIGS. 14A-14B illustrate the multi-purpose enclosure similar to that previously depicted in phantom in FIG. 2 in each of first and second (expanded) volumetric holding configurations.
Figure 14B:
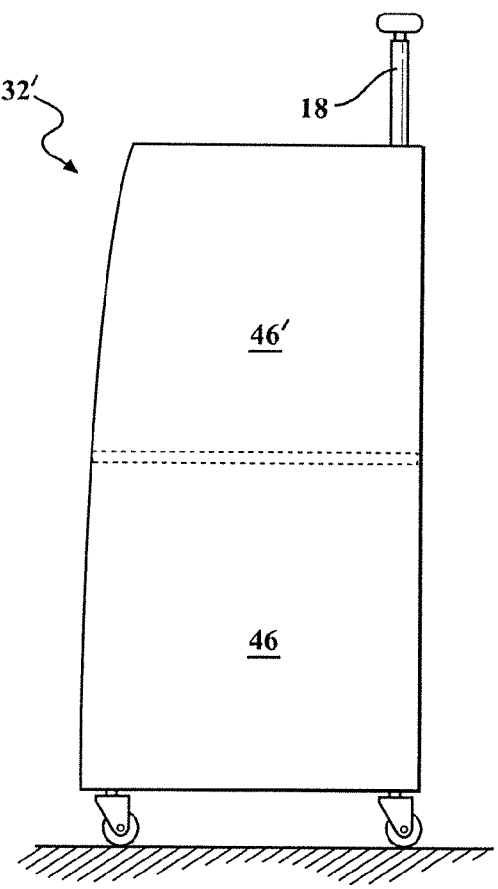

FIGS. 14A-14B illustrate the multi-purpose enclosure, generally at 32', which similar to that previously depicted in phantom in FIG. 2, in each of first and second (expanded) volumetric holding configurations. As previously described in the variant 32 in FIG. 2, each side (such as shown at 46) can include an inwardly folded flap, at 46', which is upwardly displaced from the enclosure interior (such as through the use of strip or button shaped magnets as previously described which nominally hold the flaps in magnet attracted fashion with the inner lower edges of the base sides of the enclosure).

This is done in order to expand the sides to the upward expanded and increased volumetric defined position of FIG. 14B.

As also previously described, the inner frame or skeleton (not limited to the fixed or extendible stems 41 previously described) about which is supported the fabric or like flexible material can also be configured so as to be expanded or otherwise modified to support the expanded height dimensions of the reconfigured enclosure of FIG. 14B. Without limitation, this can further include designing the supporting structure to include a lower fixed shell portion and an upper expandable wire support in order to provide structure to the upwardly folded and inter-attached portions of the flaps as shown.

Figure 15A:
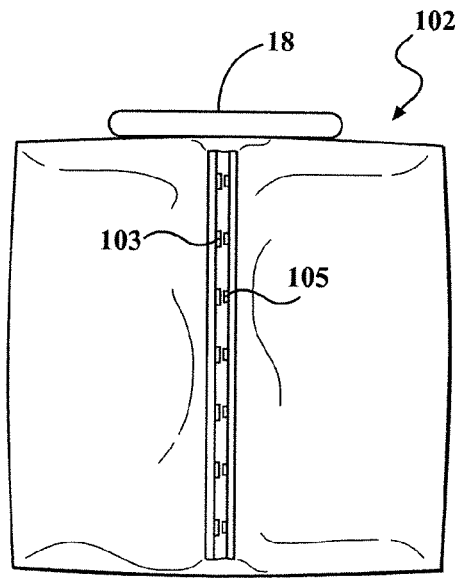
FIGS. 15A-15D are top view illustrations of the enclosure and illustrating a variety of snaps, magnets, and the like for facilitating reclose-ability of top locations of the enclosure device according to a further variant.
Figure 15B:
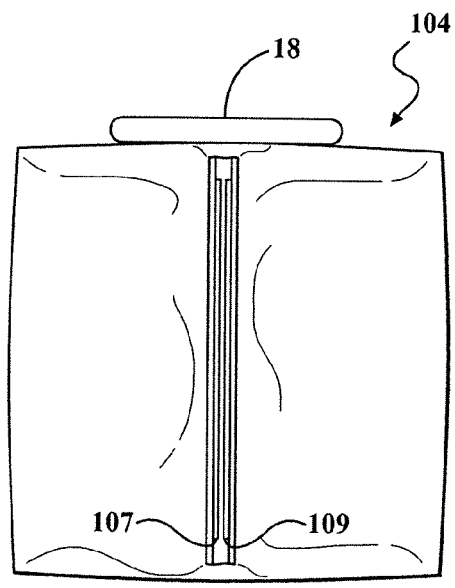
Figure 15C:
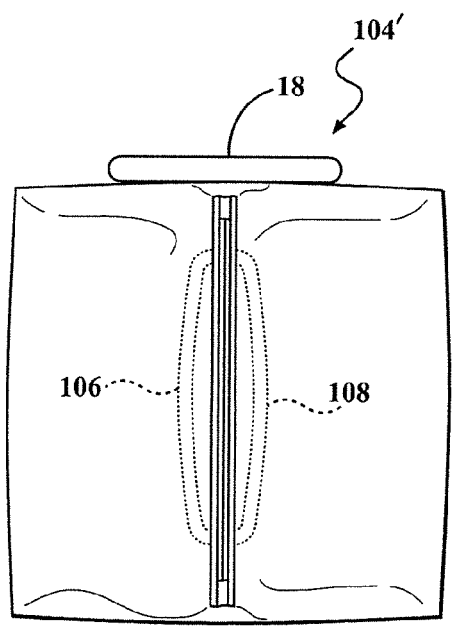
Figure 15D:
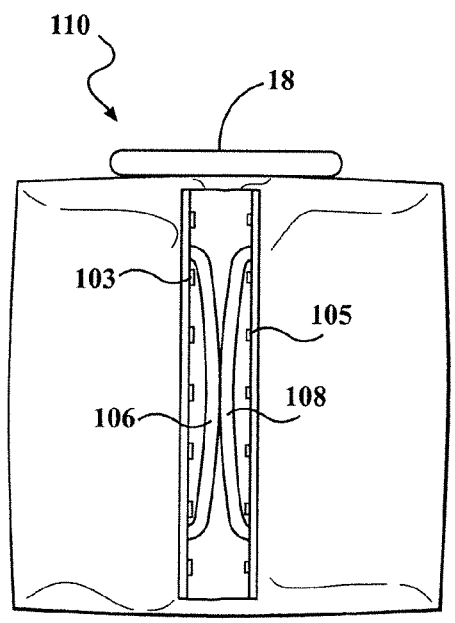

FIG. 15A-15D are top view illustrations of the enclosure and illustrating a variety of snaps, magnets, and the like for facilitating reclose-ability of a width extending top location according to a further variant. FIG. 15A depicts, at 102, button snaps (103, 105, et seq.) configured with an alternately configured top opening location of the enclosure. FIG. 15B depicts at 104 substitution of the button snaps with mutually attracted magnets, see opposing strips 107 and 109. FIG. 15C provides a further sub-variant 104' of FIG. 15B in which a pair of handles 106 and 108 are configured to be rotated in hidden fashion to align with interior surfaces of the top opening. As further shown at 110 in FIG. 15D, the rotatable handles 106 and 108 can be utilized with a similar configuration of snaps, again at 103, 105, et seq. Without limitation, additional variations of the enclosure assembly can include any combination of magnets, snaps or other mechanical closures and/or reconfigurations to the supporting structure in order to modify the assembly to any number of applications not limited to laundry or other household related uses.

Figure 17A:
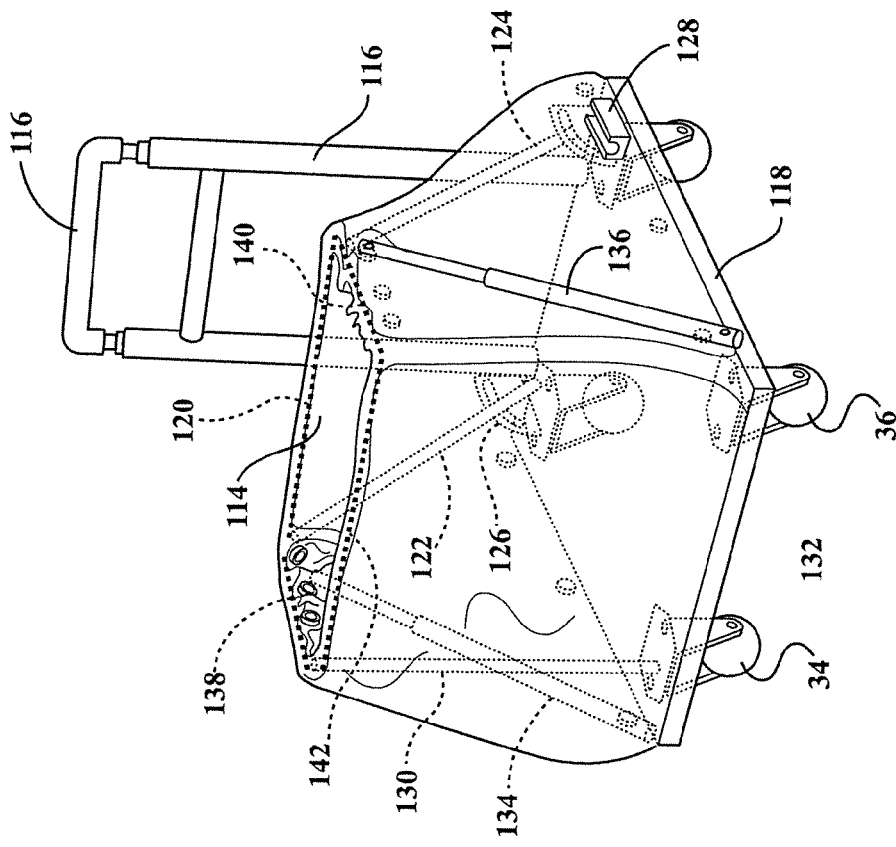
FIGS. 17A-17E collectively depict a further non-limiting example of a progression of collapsing/storage steps according to a given protocol for collapsing the item carrying enclosure.
Figure 17B:
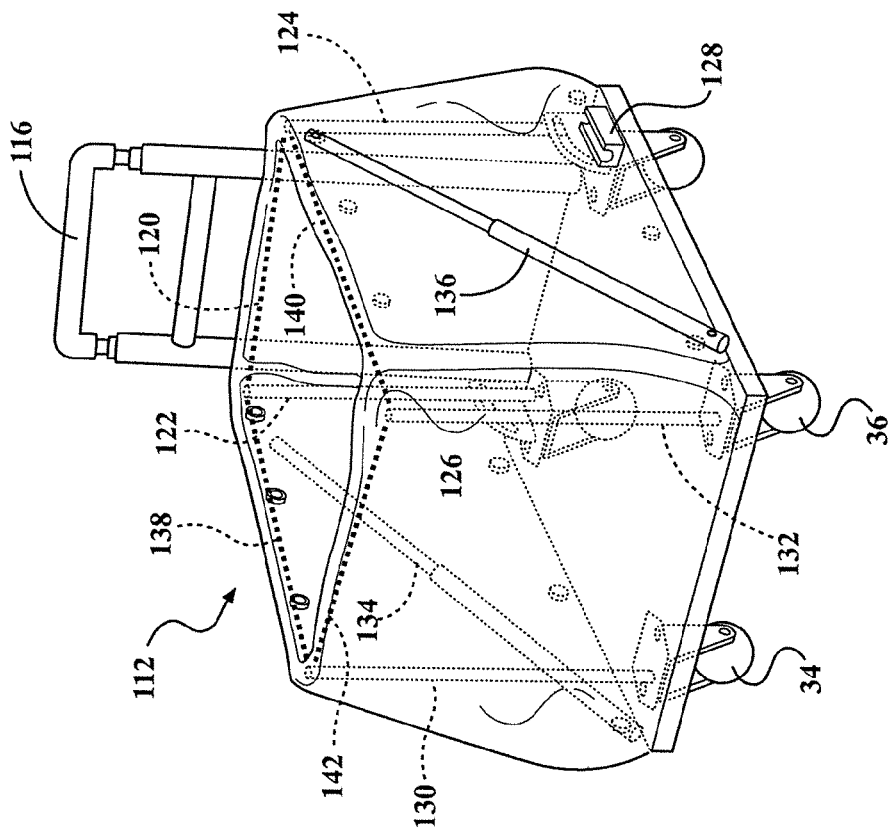

Finally, FIGS. 17A-17E depict, generally at 112, a further non-limiting example of a collapsing/storage protocol for the item carrying enclosure. FIG. 17A depicts the enclosure in a fully expanded position, with FIG. 17B an initial collapse position in which a back side 114 is inwardly and downwardly folded.

In order to facilitate collapsing of the flexible sides of the body, and consistent with that previously described, one non-limiting example of additional structure for assisting in structurally collapsing the assembly can include a plurality of interconnecting and collapsible elongated supports. The inner skeletal supports as generally defined can include any arrangement of perimeter or crosswise/diagonal extending members which create a suitable support structure for defining an interior volume within the interconnected sides and (where applicable) upper flaps of the flexible outer material.

In one non-limiting configuration, a rear support upper cross member 120 and rear vertical members 122 and 124 can be provided and can include either a rigid member or in certain instances any of soft/flexible or telescoping/collapsing members. Collapsing of the flexible rear can include the vertical members pivoting along lower channel brackets 126 and 128, such occurring following depressing a tab or trigger for releasing the sides to fold inwardly.

Addition forward vertical supports 130 and 132 in combination with cross telescoping and sliding supports 134 and 136, provide additional collapsing structure for converting the assembly from a four sided and upward extending construction to a fully collapsed storage configuration. Additional upper end supports can include telescoping side supports 138/140 extending between opposite sides of the upper end in parallel fashion, this in combination with a forward most support 142, these being illustrated only generally as with rear upper end support 120 and which are understood as extending between the upper ends of forward vertical supports 130 and 132.

Figure 17C:
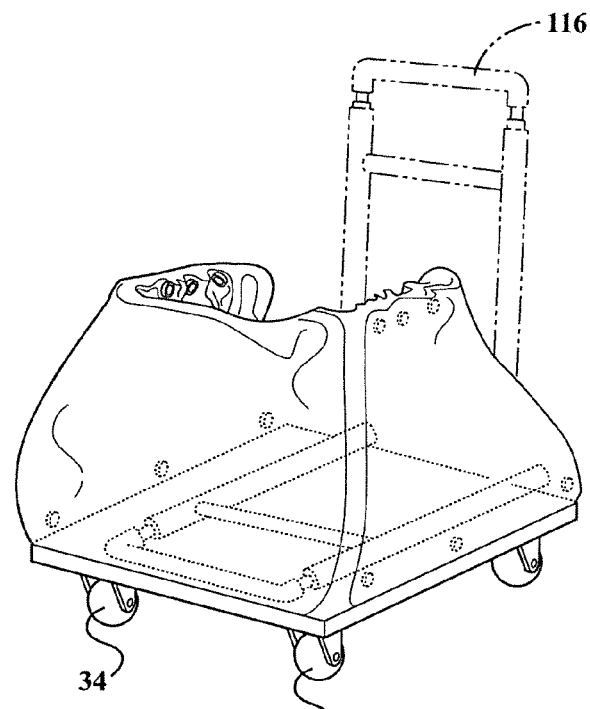
Figure 17D:
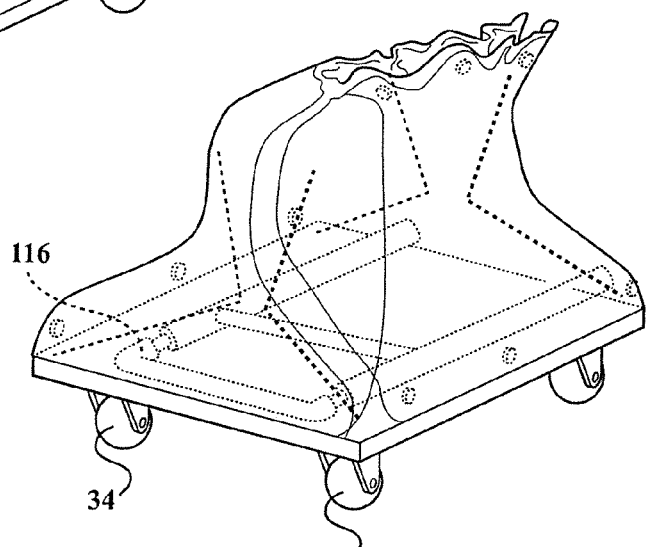
Figure 17E:
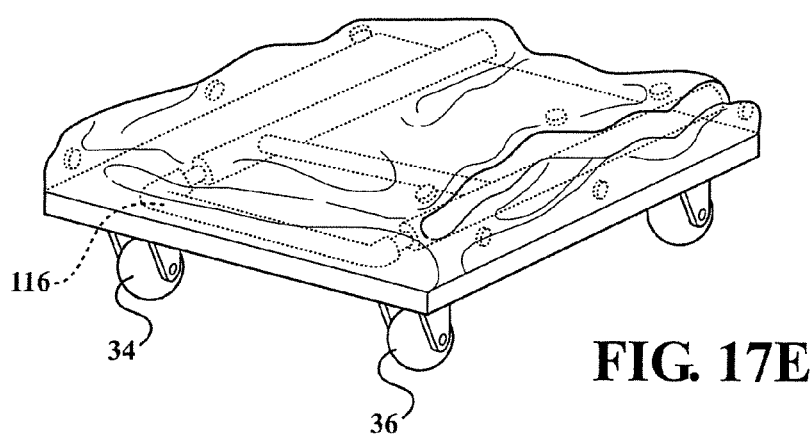

To facilitate ease of illustration, the various telescoping, fixed and pivotal portions defining the inner structural support can exhibit any combination of pivotal and telescoping construction in order to convert the device from the fully deployed condition of FIG. 17A to the fully collapsed position of FIG. 17E. This can also include the upper perimeter interconnecting sides 120, 142, 138 and 140 being either separable from one another and/or being individually telescoping to facilitate collapse of the soft fabric enclosure. Such can further envision the upper horizontal, vertical and/or diagonal arrangement members being slidably interconnected to facilitate controlled collapsing between use and volume reduced and stowed positions. As previously described, any combination of supports amounting to less than the totality of such supports shown can be substituted for the arrangement depicted in FIGS. 17A-17E, this dependent upon the level of support needed by the enclosure in the expanded position as well as the desired collapsed dimensions of the enclosure as shown in FIG. 17E.

A handle subassembly, similar to any of those previously described and referenced at 116, is affixed to a rigid edge of a base 118 and, in FIG. 17C, is subsequently folded inwardly as shown between upright, intermediately folded and fully downwardly and horizontally folded positions. Subsequently, at FIG. 17D, a related variant of an inner supporting frame construction is depicted in phantom with angularly collapsible mid-point location and so that the frame construction may be collapsed to permit the previously supported sides to be folded together in a fashion not dissimilar to a corrugated paperboard bag. FIG. 17E depicts a fully collapsed position (the framing members now depicted here for ease of illustration) and in which the assembly can be stored in a manner such as previously described.

Having described my invention, other and additional preferred embodiments will become apparent to those skilled in the art to which it pertains, and without deviating from the scope of the appended claims.

I claim:

1. A wheeled enclosure, comprising:
   an interior volume defining body including a rigid base and a plurality of upwardly extending and flexible sides;
   a plurality of wheeled supports incorporated into said rigid base;
   a perimeter establishing frame extending upwardly from said rigid base and providing inner structural support to said flexible sides;
   said frame including a pair of telescoping supports pivotally secured to edge locations of said rigid base and extending diagonally upwardly between said rigid base and upper reinforced edge locations of said flexible sides so that said frame can be converted between upward expanded and inward collapsed positions;
   a pair of channel brackets secured to upper surfaces of said rigid base and resistively seating said telescoping supports in said collapsed position;
   said frame further including front and rear pairs of elongated supports between corner locations of said rigid base and additional upper reinforced edge locations of said flexible sides, said elongated supports being removable prior to collapsing of said telescoping supports; and
   a telescoping handle anchored to said rigid base and extending above a rear of said body.

2. The invention as described in claim 1, further comprising said handle being pivotally secured to an edge of said rigid base.

3. The invention as described in claim 1, further comprising gripping handles integrated into upper opposing edge locations of a pair of said flexible sides of said body, said gripping handles being displaced against each other in order to establish a reclosable top to said volume defining body.

4. The invention as described in claim 1, further comprising an accessory supporting pocket secured to an exterior of at least one side.

5. The invention as described in claim 1, said plurality of wheeled supports further comprising any of cylindrical or spherical shaped castors.

6. The invention as described in claim 1, said upwardly extending sides each further comprising an end extending flap convertible between an inwardly folded position and an upwardly extending and increased height and interior volume defining position.

7. The invention as described in claim 6, further comprising any one of snaps, magnets or mechanical closures for restraining said flaps in said inwardly folded position.

8. The invention as described in claim 6, further comprising an inter-edge engaging portions associated with each flap in said upwardly extending position.

9. The invention as described in claim 1, further comprising a pair of shoulder supporting straps secured to upper edges of said sides to facilitate carrying in a handle retracted and enclosure expanded position.

10. The invention as described in claim 1, said plurality of upwardly extending and flexible sides further comprising any a fabric material.

11. The invention as described in claim 1, further comprising said pivotally supported and diagonally extending telescoping supports and channel brackets being located outwardly of said upwardly extending and flexible sides.

12. The invention as described in claim 11, further comprising said removable pairs of elongated supports being located within said interior volume defining body defined by said upwardly extending and flexible sides.

* * * * *